US009478059B2

(12) United States Patent
Terry et al.

(10) Patent No.: US 9,478,059 B2
(45) Date of Patent: Oct. 25, 2016

(54) ANIMATED AUDIOVISUAL EXPERIENCES DRIVEN BY SCRIPTS

(71) Applicant: PocketGems, Inc., San Francisco, CA (US)

(72) Inventors: Daniel Terry, New York, NY (US); Matthew J. Donahoe, Burlingame, CA (US); Alan Lac, Berkeley, CA (US)

(73) Assignee: PocketGems, Inc., San Francisco, CA (US)

( * ) Notice: Subject to any disclaimer, the term of this patent is extended or adjusted under 35 U.S.C. 154(b) by 0 days.

(21) Appl. No.: 14/444,984

(22) Filed: Jul. 28, 2014

(65) Prior Publication Data
US 2016/0027198 A1 Jan. 28, 2016

(51) Int. Cl.
*G06T 13/20* (2011.01)
*G06T 13/80* (2011.01)
*G06F 17/30* (2006.01)
*G06T 13/40* (2011.01)
*G06F 17/28* (2006.01)

(52) U.S. Cl.
CPC ............ *G06T 13/80* (2013.01); *G06F 17/28* (2013.01); *G06F 17/30* (2013.01); *G06T 13/40* (2013.01); *G06T 2213/12* (2013.01)

(58) Field of Classification Search
CPC ........ G06F 17/20; G06F 17/30; G06F 17/28; G06T 13/80; G06T 13/40; G06T 2213/12; G06T 13/205
See application file for complete search history.

(56) References Cited

U.S. PATENT DOCUMENTS

| | | | |
|---|---|---|---|
| 8,856,748 B1 * | 10/2014 | Larsen et al. | 717/125 |
| 2004/0027352 A1 * | 2/2004 | Minakuchi | 345/473 |
| 2007/0146360 A1 * | 6/2007 | Clatworthy et al. | 345/419 |
| 2009/0300515 A1 * | 12/2009 | Min et al. | 715/751 |
| 2013/0124984 A1 * | 5/2013 | Kuspa | 715/255 |
| 2014/0089804 A1 * | 3/2014 | Gazit et al. | 715/723 |

OTHER PUBLICATIONS

"Banner Ad—AdMob Android Guides", Google Inc, available in 2006. https://developers.google.com/mobile-ads-sdk/docs/admob/android/banner.*
"Fruit Ninja", published by Halfbrick Studios, released in 2010. https://itunes.apple.com/us/app/fruit-ninja/id362949845?mt=8.*
"Episode—Choose Your Story", published by Episode Interactive, Nov. 17, 2014. https://itunes.apple.com/us/app/episode-choose-your-story/id656971078?mt=8 https://play.google.com/store/apps/details?id=com.episodeinteractive.android.catalog&hl=en http://www.amazon.com/gp/product/B00llY2DP0.*
App Annie, "Episode—Choose Your Story", p. 1-4. https://www.appannie.com/apps/ios/app/episode-choose-your-story/.*
PocketGems Inc., "Script Format", p. 1-3. https://pg-story.appspot.com/write/guides?active_guide=commands.*

(Continued)

*Primary Examiner* — Xiao Wu
*Assistant Examiner* — Chong Wu
(74) *Attorney, Agent, or Firm* — Hickman Palermo Becker Bingham LLP; Malgorzata A. Kulczycka

(57) ABSTRACT

In an embodiment, a computerized method comprises receiving a meta-language file comprising a conversion of a script file in a natural language format, the script file including a plurality of natural language statements; interpreting, by a first computing device, the meta-language file to execute at least a first portion of the meta-language file; dynamically generating and displaying, on the first computing device, one or more visually animated graphical elements in accordance with the execution of at least the first portion of the meta-language file.

30 Claims, 14 Drawing Sheets

(56) References Cited

OTHER PUBLICATIONS

PocketGems Inc., "Master List of Directing Commands", p. 1-5. https://pg-story.appspot.com/write/guides?active_guide=commands.*

PocketGems Inc., "Play the Tutorial 1", line 1-87. https://pg-story.appspot.com/write/story/TutorialStory_0xl5glRU/1.* http://www.appannie.com/appshos/app/656971078/rank-history/#vtype=day&countries=CA&start=2013-07-29&end=2015-03-18&device=iphone&view=rank&lm=lf, publication date unknown, last accessed on Mar. 18, 2015, 3 pages.

http://www.appannie.com/apps/google-play/publisher/20200000443897/, publication date unknown, last accessed on Feb. 13, 2015, 2 pages.

http://www.appannie.com/appshos/publisher/best-top-free-fun-games-inc/, publication date unknown, last accessed on Feb. 13, 2015, 2 pages.

Anonymous, screenshots of Campus Crush information submitted to iTunes, publication date unknown, last accessed on Mar. 17, 2015, 3 pages.

Anonymous, screenshots of Campus Crush, publication date unknown, last accessed on Mar. 17, 2015, 10 pages.

* cited by examiner

ANIMATED AUDIOVISUAL EXPERIENCES DRIVEN BY SCRIPTS

FIELD OF THE DISCLOSURE

The present disclosure relates to scripted stories. The disclosure relates more specifically to computer-implemented techniques for creation and automatic performance of scripted stories in audiovisual format.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Stories in script form are typically written by scriptwriters in plain text, a script specifying the characters, dialog, backgrounds, props, director or stage directions, and scenes of a story. In order for a script to be performed or acted out, time, effort, and resources are required. Among other things, backgrounds and sets may need to be built, props and costumes acquired, actors are needed to play the characters, a director is required to coordinate the actors, stagehands, and other persons involved as specified by the script, and the like. Each change in the script, in turn, requires a corresponding change in the performance of the script.

In a computerized environment, characters may be represented as avatars and the avatars may be programmed to speak dialog, move a certain way, or otherwise serve as substitutes for human actors. Typically technical persons, such as computer programmers or coders, write program code to specify avatars and their performance actions. Such program code is in computer programming languages that are not familiar to non-technical writers, such as scriptwriters. Although scriptwriters are the experts in writing a story in script form, as opposed to computer programmers, scriptwriters likely lack the requisite computer programming knowledge to write a story in script form in computer programming languages capable of generating avatar performances.

For laypersons not versed in scriptwriting or computer programming, it is even more difficult to easily write a story in script form and have it easily and quickly performed with all the elements specified in the script.

DETAILED DESCRIPTION OF EXAMPLE EMBODIMENTS

Figure 1:
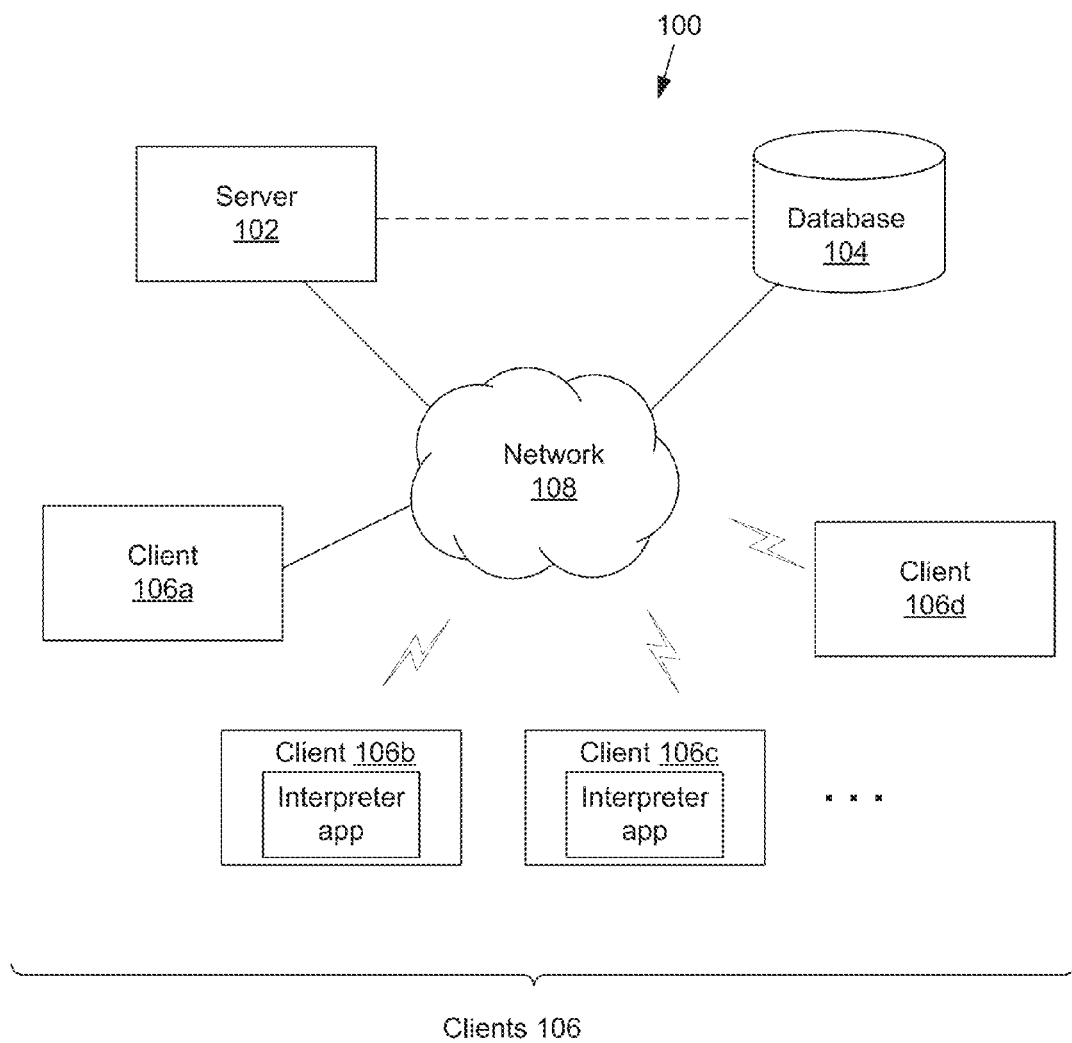
FIG. 1 illustrates an example system for providing animated audiovisual experiences driven by scripts, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 OVERVIEW

In an embodiment, a computerized method comprises receiving a meta-language file comprising a conversion of a script file in a natural language format, the script file including a plurality of natural language statements; interpreting, by a first computing device, the meta-language file to execute at least a first portion of the meta-language file; dynamically generating and displaying, on the first computing device, one or more visually animated graphical elements in accordance with the execution of at least the first portion of the meta-language file.

In an embodiment, the computerized method further comprises, wherein the plurality of natural language statements included in the script file comprises one or more dialog natural language statements, and wherein dynamically generating and displaying the one or more visually animated graphical elements comprises dynamically generating and displaying one or more visually animated characters that speaks according to the one or more dialog natural language statements.

In an embodiment, the computerized method further comprises, wherein the plurality of natural language statements included in the script file comprises one or more dialog natural language statements, and wherein dynamically generating and displaying the one or more visually animated graphical elements comprises dynamically generating and displaying one or more visually animated speech bubbles according to the one or more dialog natural language statements.

In an embodiment, the computerized method further comprises, wherein the one or more dialog natural language statements is associated with a narrator of a story.

In an embodiment, the computerized method further comprises, wherein the plurality of natural language statements included in the script file comprises one or more character movement control natural language statements, and wherein dynamically generating and displaying the one or more visually animated graphical elements comprises dynamically generating and displaying one or more visually animated characters moving according to the one or more character movement control natural language statements.

In an embodiment, the computerized method further comprises, wherein the plurality of natural language statements included in the script file comprises one or more stage direction natural language statements, and wherein dynamically generating and displaying the one or more visually animated graphical elements comprises dynamically generating and displaying one or more visually animated characters located within a graphical setting according to the one or more stage direction natural language statement.

In an embodiment, the computerized method further comprises, wherein the plurality of natural language statements included in the script file comprises one or more character behavior natural language statements, and wherein dynamically generating and displaying the one or more visually animated graphical elements comprises dynamically generating and displaying one or more visually animated characters performing particular behavior actions according to the one or more character behavior natural language statement.

In an embodiment, the computerized method further comprises, wherein the plurality of natural language statements included in the script file comprises one or more background natural language statements, and wherein dynamically generating and displaying the one or more visually animated graphical elements comprises dynamically generating and displaying one or more visually animated backgrounds according to the one or more background natural language statement.

In an embodiment, the computerized method further comprises, wherein the plurality of natural language statements included in the script file comprises one or more character outfit natural language statements, and wherein dynamically generating and displaying the one or more visually animated graphical elements comprises dynamically generating and displaying one or more visually animated characters wearing one or more respective clothing and accessories according to the one or more character outfit natural language statement.

In an embodiment, the computerized method further comprises, wherein the plurality of natural language statements included in the script file comprises one or more audio natural language statements, and further comprising dynamically generating and audibly presenting one or more audio elements according to the one or more audio natural language statements.

In an embodiment, one or more non-transitory machine-readable media storing instructions which, when executed by one or more processors, cause performance comprising: receiving a meta-language file comprising a conversion of a script file in a natural language format, the script file including a plurality of natural language statements; interpreting, by a first computing device, the meta-language file to execute at least a first portion of the meta-language file; dynamically generating and displaying, on the first computing device, one or more visually animated graphical elements in accordance with the execution of at least the first portion of the meta-language file.

In an embodiment, the one or more non-transitory machine-readable media further comprises, wherein dynamically generating and displaying comprises dynamically generating and displaying one or more visually animated avatars representative of respective one or more characters specified in the script file.

In an embodiment, the one or more non-transitory machine-readable media further comprises, wherein the meta-language file comprises a JavaScript Object Notation (JSON) file.

In an embodiment, the one or more non-transitory machine-readable media further comprises, wherein the instructions, when executed by the one or more processors, further cause performance comprising generating the script file based on user input of the plurality of natural language statements.

In an embodiment, the one or more non-transitory machine-readable media further comprises, wherein the user input is provided on the first computing device or a second computing device that is different from the first computing device.

In an embodiment, the one or more non-transitory machine-readable media further comprises, wherein the instructions, when executed by the one or more processors, further cause performance comprising: receiving one or more supporting files; wherein interpreting the meta-language file comprises using the one or more supporting files to identify one or more graphical representations corresponding to the one or more visually animated graphical elements; wherein dynamically generating and displaying comprises dynamically rendering at runtime, the one or more graphical representations in accordance with the meta-language file to dynamically display the one of more visually animated graphical elements.

In an embodiment, the one or more non-transitory machine-readable media further comprises, wherein dynamically generating and displaying the one or more visually animated graphical elements comprises: dynamically generating and displaying a character image; dynamically generating and displaying one or more animated images of individual moving body parts of the character without re-generating or re-displaying the entire character.

In an embodiment, the one or more non-transitory machine-readable media further comprises, wherein the one or more visually animated graphical elements comprise one or more user interface (UI) commands associated with presenting one or more listings of a plurality of available story representations in a story catalog, each of the plurality of available story representations corresponding to a respective animated story.

In an embodiment, the one or more non-transitory machine-readable media further comprises, wherein the plurality of natural language statements in the script file includes one or more references to web pages; wherein interpreting the meta-language file comprises interpreting the meta-language file to execute a second portion of the meta-language file associated with the one or more references to web pages; wherein dynamically generating and displaying comprises dynamically generating and displaying one or more web pages in accordance with the execution of the second portion of the meta-language file.

In an embodiment, the one or more non-transitory machine-readable media further comprises, wherein the plurality of natural language statements in the script file includes one or more monetization commands, and wherein dynamically generating and displaying comprises dynamically generating and displaying the one or more visually animated graphical elements to use virtual or real currency by a user interfacing with the first computing device.

In an embodiment, the one or more non-transitory machine-readable media further comprises, wherein the one or more monetization commands includes one or more counter commands to selectively alter a state value associated with the user to control access to one or more portions of the script file by the user.

In an embodiment, the one or more non-transitory machine-readable media further comprises, wherein the plurality of natural language statements in the script file includes one or more choice commands, and wherein the instructions, when executed by the one or more processors, further cause performance comprising: receiving, at the first computing device, a user selection of a choice from among at least a first choice and a second choice associated with the one or more choice commands, at least the first and second choices presented as the one or more visually animated graphical elements; in response to receiving the first choice as the user selected choice, interpreting the meta-language file comprising interpreting the meta-language file to execute the first portion of the meta-language file corresponding to a first branch associated with the first choice, and dynamically generating and displaying comprising dynamically generating and displaying one or more first visually animated graphical elements in accordance with the execution of the first portion of the meta-language file corresponding to the first branch associated with the first choice; in response to receiving the second choice as the user selected choice, interpreting the meta-language file to execute a second portion of the meta-language file corresponding to a second branch associated with the second choice, and dynamically generating and displaying one or more second visually animated graphical elements in accordance with the execution of the second portion of the meta-language file corresponding to the second branch associated with the second choice.

In an embodiment, the one or more non-transitory machine-readable media further comprises, wherein the instructions, when executed by the one or more processors, further cause performance comprising saving the user selected choice for use in dynamically generating and displaying an another portion of the meta-language file or an another meta-language file associated with an another script file that is different from the script file.

In an embodiment, one or more non-transitory machine-readable media storing instructions which, when executed by one or more processors, cause performance comprising: dynamically generating and displaying, at a first computing device, one or more visually animated graphical elements in accordance with script data; wherein the script data comprises one or more dialog statements and at least one of one or more character movement control statements and one or more character animation statements one or more stage direction statements composed in natural language syntax; wherein the one or more visually animated graphical elements comprise one or more speech bubbles according to the one or more dialog statements.

In an embodiment, the one or more non-transitory machine-readable media further comprises, wherein the instructions, when executed by the one or more processors, further cause performance comprising: receiving, at the first computing device, the script data or representation of the script data in response to a selection of the script data by a user; responsive to the selection of the script data, dynamically interpreting, by the first computing device, the script data or representation of the script data to render at least a first portion of the script data.

In an embodiment, the one or more non-transitory machine-readable media further comprises, wherein the representation of the script data comprises a translation of the script data in a computer-readable format.

In an embodiment, the one or more non-transitory machine-readable media further comprises, wherein the instructions, when executed by the one or more processors, further cause performance comprising: receiving the script data based on user input of the one or more dialog statements and at least one of the one or more character movement control statements and the one or more character animation statements composed in natural language syntax; wherein dynamically generating and displaying are prevented until errors identified in an automatic testing of the script data are resolved in the script data.

In an embodiment, the one or more non-transitory machine-readable media further comprises, wherein the script data comprises at least one of: (1) one or more user interface (UI) statements associated with dynamically generating and displaying one or more listings of a plurality of available story representations in a story catalog, each of the plurality of available story representations corresponding to a respective animated story, (2) one or more references to web pages associated with dynamically generating and displaying one or more web pages in accordance with the one or more references to the web pages, and (3) one or more choice statements associated with dynamically generating and displaying one or more graphical choice elements for interaction with a user during the dynamically generating and displaying of the one or more visually animated graphical elements.

In an embodiment, the one or more non-transitory machine-readable media further comprises, wherein the script data comprises one or more audio natural language statements, and wherein the instructions, when executed by the one or more processors, further cause performance comprising: dynamically generating and audibly presenting one or more audio elements according to the one or more audio natural language statements.

In an embodiment, the one or more non-transitory machine-readable media further comprises, wherein dynamically generating and displaying the one or more visually animated graphical elements comprises: dynamically generating and displaying a character image; dynamically generating and displaying one or more animated images of individual moving body parts of the character without re-generating or re-displaying the entire character.

In some embodiments, any combination of features and/or sub-features of the above methods and/or instructions stored in non-transitory machine-readable media are possible to form new combinations of methods, non-transitory machine-readable media storing instructions, and apparatus for performing the methods. Thus, the present disclosure is not intended to be limited to the embodiments shown, but is to be accorded the widest scope consistent with the principles and features disclosed herein.

2.0 EXAMPLE COMPUTER SYSTEM IMPLEMENTATION

In one embodiment, a computer-implemented method enables creation of script files in a scripting language having natural language scripting elements and interactive if/then logic elements. The natural language scripting elements may include dialog, character movement, character placement, character outfit changes, background control, camera control, audio control, and the like. The if/the logic elements may include interactive choices, branching, and complex branching operations. Each script file may be automatically transformed into a meta-language file that is executable on a client device. The script file, the corresponding meta-language file, and/or character definitions also may be used to generate one or more data tables to support the meta-language file. Character definitions may be specified using a GUI environment that is separate from script creation.

In an embodiment, in response to a user request at a mobile device for a particular chapter of a story, which corresponds to a particular script file, a file package may be automatically generated for transmission to the mobile device. The file package may include the meta-language file corresponding to the particular script file and one or more supporting files or data. The mobile device, at runtime, dynamically animates visual and/or audio elements in accordance with the meta-language file and the one or more supporting files or data. The animated audiovisual experience comprises a performance of acting out of the scripted chapter story. During performance of the scripted chapter story, the animation may be user interactive. The performance may be dynamically customized based on the user response(s). Other embodiments may operate using a single computer and do not require a separate authoring computer and mobile device or other second computer.

The scripting language may be configured for use in areas outside of scriptwriting. Possible uses include, but are not limited to, scripts configured to provide a user interface (UI) on the mobile device for consuming stories; scripts configured to control access to the stories from mobile devices by enforcing a monetization policy; scripts configured to reference web pages; and the like. A scripting portal may provide a wealth of supporting services to facilitate easy use and quality scripts.

Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

FIG. 1 illustrates an example system 100 in which the techniques described herein may be practiced, according to some embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes a server computer or "server" 102, a database 104, one or more client computers or "clients" 106, and a network 108. Each of the server 102, database 104, and clients 106 is in wired or wireless communication with the network 108.

Server 102 comprises one or more servers, computers, processors, database servers, web server, and/or computing devices configured to communicate with the database 104 and/or clients 106 via network 108. The server 102 facilitates performance of the techniques described herein. Server 102 hosts one or more applications, websites, portals, or other visual or user interface mechanisms related to animated audiovisual experiences driven by scripts as described in detail below. Server 102 may be located at one or more geographically distributed locations. Although one server 102 is shown in FIG. 1, system 100 may, depending on the embodiment, comprise one, two, or any number of servers 102, which may work alone and/or collectively to provide the functionality described herein.

Database 104 comprises one or more databases or storage devices configured to store and maintain data and/or instructions for use by server 102 and/or clients 106 as described herein. Database 104 may, in some embodiments, be located at one or more geographically distributed location relative to server 102. Server 102 and/or clients 106 may, in some embodiments, access database 104 via network 108. Alternatively, server 102 may access database 104 without needing network 108. As another alternative, database 104 may be included within server 102. System 100 may, depending on the embodiment, comprise one, two, or any number of databases 104 configured to individually and/or collectively store the data described herein.

Clients 106 comprise computing devices, including but not limited to, work stations, personal computers, general purpose computers, laptops, Internet appliances, handheld devices, wireless devices, wired devices, portable devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. An individual one of the clients 106 is denoted as a client 106a, client 106b, client 106c, client 106d, or a client 106. Each of the clients 106 includes applications, app, software, and/or other executable instructions to facilitate various aspects of the techniques described herein. At least a few of the clients 106 include an interpreter app (also referred to as an interpretation app), a dedicated application for facilitating animated audiovisual experiences driven by scripts, downloaded from server 102. Others of the clients 106 include a web browser application and/or the interpreter app. Clients 106 may also include additional applications or other interface capabilities to communicate with the server 102 and/or database 104. Clients 106 may, depending on the embodiment, be located geographically dispersed from each other. Although four clients 106 are shown in FIG. 1, more or less than four clients 106 may be included in system 100. Clients 106 are also referred to as devices, requesting devices, requesting clients, requestors, and the like.

Network 108 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 108 comprises a public network, security features (e.g., VPN/SSL secure transport) may be included to ensure authorized access within system 100.

Figure 2:
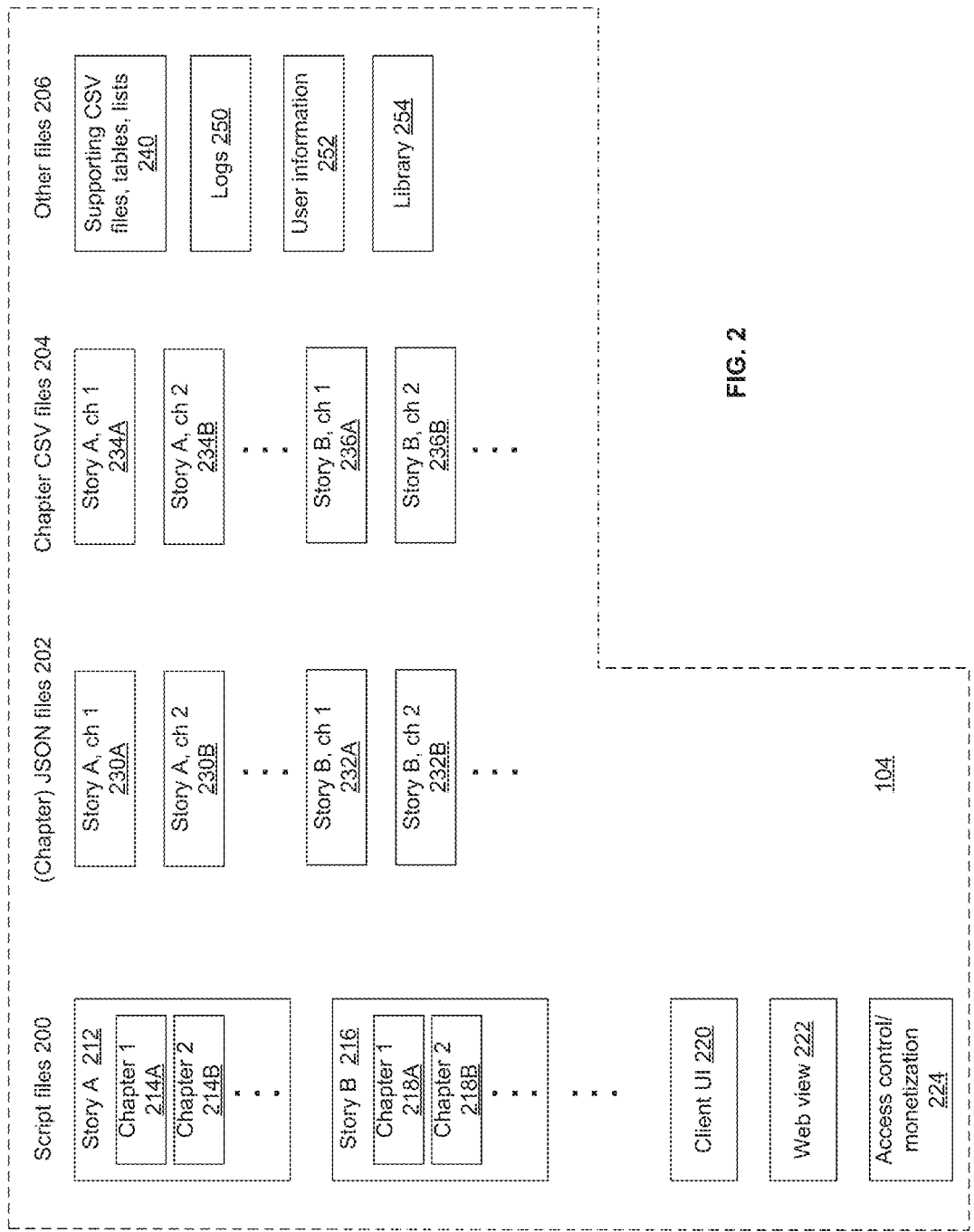
FIG. 2 illustrates example data objects or data files included in the system of FIG. 1, according to some embodiments.

FIG. 2 illustrates example data objects or data files included in the database 104, according to some embodiments. For purposes of illustrating clear examples, some embodiments are described with reference to using JavaScript Object Notation (JSON) files and/or Comma Separated Value (CSV) files or data structures for storing various data. However, other embodiments may use other data structures or file formats and the references to JSON and CSV are not intended as requirements.

Data objects may include, without limitation, script files 200, JSON files 202, chapter CSV files 204, and other files 206. The script files 200 may comprise a plurality of chapter script files 214A, 214B, 218A, 218B, one or more client user interface (UI) script file 220, one or more webviews script file 222, and one or more access control script file 224 (also referred to as monetization script file 224). Script files 214A, 214B, 218A, 218B may comprise stories written in script form using a scripting language by users; and script files 220, 222, and 224 comprise additional uses of the scripting language to enable other functionalities relating to animated audiovisual experiences.

Each scripted story 212, 216 may be organized in one or more chapters, each chapter corresponding to a chapter script file. Each chapter script file may be associated with a chapter JSON file, a chapter CSV file, and one or more other files. As described in detail below, chapter JSON files, chapter CSV files, and one or more other files may comprise translations of script files and character definitions into formats useable in runtime rendering of the corresponding animated audiovisual elements of a script (e.g., act out or perform the scripted story).

Scripted story 212 includes at least a chapter script file 214A for chapter 1 of the story and a chapter script file 214B for chapter 2 of the story. A chapter JSON file 230A and a chapter CSV file 234A correspond with chapter script file 214A. A chapter JSON file 230B and a chapter CSV file 234B correspond with chapter script file 214B. Similarly, scripted story 216 includes at least a chapter script file 218A for chapter 1 of the story and a chapter script file 218B for chapter 2 of the story. A chapter JSON file 232A and a chapter CSV file 236A correspond with chapter script file 218A. A chapter JSON file 232B and a chapter CSV file 236B correspond with chapter script file 218B.

In an alternative embodiment, the various chapter CSV files (e.g., chapter CSV files 234A, 234B, 236A, 236B) can be combined into a single chapter CSV file that is maintained as new chapter script files are created and/or updated, and which is associated with all of the chapter script files.

Although not shown, each of the UI script file 220, web view script file 22, and access control script file 224 has a corresponding JSON file and also, in some instances, one or more CSV files.

The other files 206 include supporting files 240 (e.g., CSV files and/or property list (plist) files, such as a place CSV file), a log file 250, a user information file 252, and library 254. The other files 206 comprise data used to facilitate animation rendering, system administration, and user profile administration. Library 254 includes a plurality of sound files, music files, audio files, graphical image files (e.g., avatars, backgrounds, outfits), character animations or behavior files, and the like. The plurality of files may be files pre-defined by the server 102. At least some of the plurality of files may comprise user-generated or user-supplied files uploaded to the library 254, in some embodiments.

FIG. 2 and the associated description comprise one implementation embodiment for automatically providing animated audio and/or visual experiences driven by scripts. In other embodiments, as noted above, JSON files 202 may be files in other formats than in the JSON format. JSON files 202, chapter CSV files 204, and/or supporting files 240 may be omitted, in some embodiments. Chapter CSV files 204 and/or supporting files 240 may be included in the corresponding JSON files 202 or equivalent, in some embodiments. Files in CSV format (e.g., CSV files 204 and one or more of the supporting files 240) may be in other tabbed or tabular formats than in the CSV format, in some embodiments.

Details regarding these data files are described in specific sections below. In this disclosure, the term for a data file and the contents of the data file may be used interchangeably. For example, the terms script file, script data file, and script may be used interchangeably herein.

Figure 3:
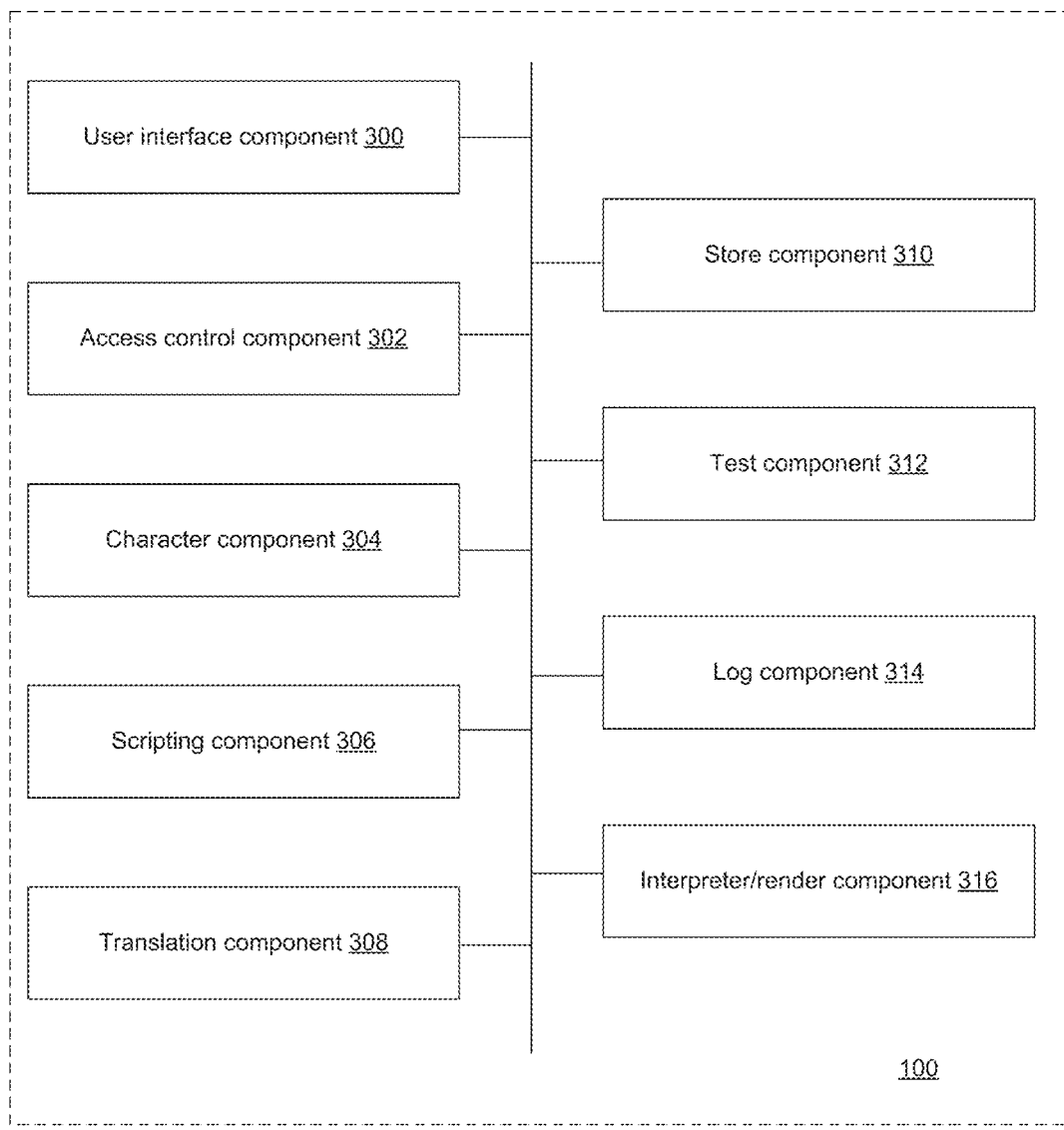
FIG. 3 illustrates example components included in the system of FIG. 1, according to some embodiments.

FIG. 3 illustrates example components that may be included in system 100 to perform the script creation, animation rendering, and associated functionalities, according to some embodiments. The components are associated with a script writing and/or delivery pipeline. The various components of system 100 are implemented at least partially by hardware at one or more computing devices, such as one or more hardware processors executing instructions stored in one or more memories for performing various functions described herein. The components are communicatively coupled (e.g., via appropriate interfaces) to each other and to various data sources, so as to allow information to be passed between the components and/or to share and access common data. FIG. 3 illustrates only one of many possible arrangements of components configured to perform the functionality described herein. Other arrangements may include fewer or different components, and the division of work between the components may vary depending on the arrangement.

System 100 includes a user interface component 300, an access control component 302, a character component 304, a scripting component 306, a translation component 308, a store component 310, a test component 312, a log component 314, and a interpreter/render component 316. In some embodiments, components 300-314 are included in the server 102, and at least component 316 is included in the interpreter app of one or more of clients 106. In other embodiments, components 300-314 are included in the server 102, and components 300, 310, and 316 are included in the interpreter app of one or more of clients 106.

The user interface component 300 provides user interface functionalities to users interfacing with clients 106 to enable writing scripts, defining characters in the scripts, receiving user inputs such as selection of a particular chapter to animate, user authentication data, user selection in response to conditionals presented during the animation, and the like. In some embodiments, one or more of the user interface functionalities at a rendering client 106 may be performed by render/interpreter component 316 instead of user interface component 300.

The access control component 302 relates to controlling user access to the system 100 (e.g., based on valid user login and password), user access to specific scripts, coordinating passes and virtual currency used in system 100, monetization functionalities, and the like. Character component 304 relates to defining characters in each of a given script, such as specifying avatars, outfits, character names, and the like. Scripting component 306 is involved in creation of scripts by users using a scripting language. The character definitions and written scripts are translated by the translation component 308 into JSON and CSV files, which are stored in database 104 by store component 310.

When a script is first created, the test component 312 automatically performs one or more checks or tests on the created script to automatically flag errors, inconsistencies, incomplete creation, and/or other checks associated with proper rendering of the script in animation format. Test component 312 may also facilitate enabling version control of scripts, or pre-publication and publication functionalities.

The JSON and CSV files corresponding to a given script are sent to the client 106 requesting playback of the given script, and they are rendered by the interpreter/render component 316. As described in detail below, the rendering is performed dynamically at runtime and may involve accessing additional data such as image files to perform the rendering. As the user views and/or interacts with the audiovisual animation corresponding to the given script, user interactions or actions taken in relation to the animation are logged by log component 314. Various files, data, and other items generated in the course of interpreting the files, rendering the files, interacting with the files, selection of files, and the like may also be logged by log component 314 and stored in database 104 in log file 250.

In one embodiment, components 300-316 comprise one or more software components, programs, applications, or other units of code base or instructions configured to be executed by one or more processors included in the server 102 and/or a client 106. Although components 300-316 are depicted as distinct components in FIG. 3, components 300-316 may be implemented as fewer or more components than illustrated. Any of components 300-316 may communicate with one or more devices included in the system 100, such as server 102, database 104, or clients 106.

3.0 FUNCTIONAL OVERVIEW RELATING TO AUTHOR USER

Figure 4:
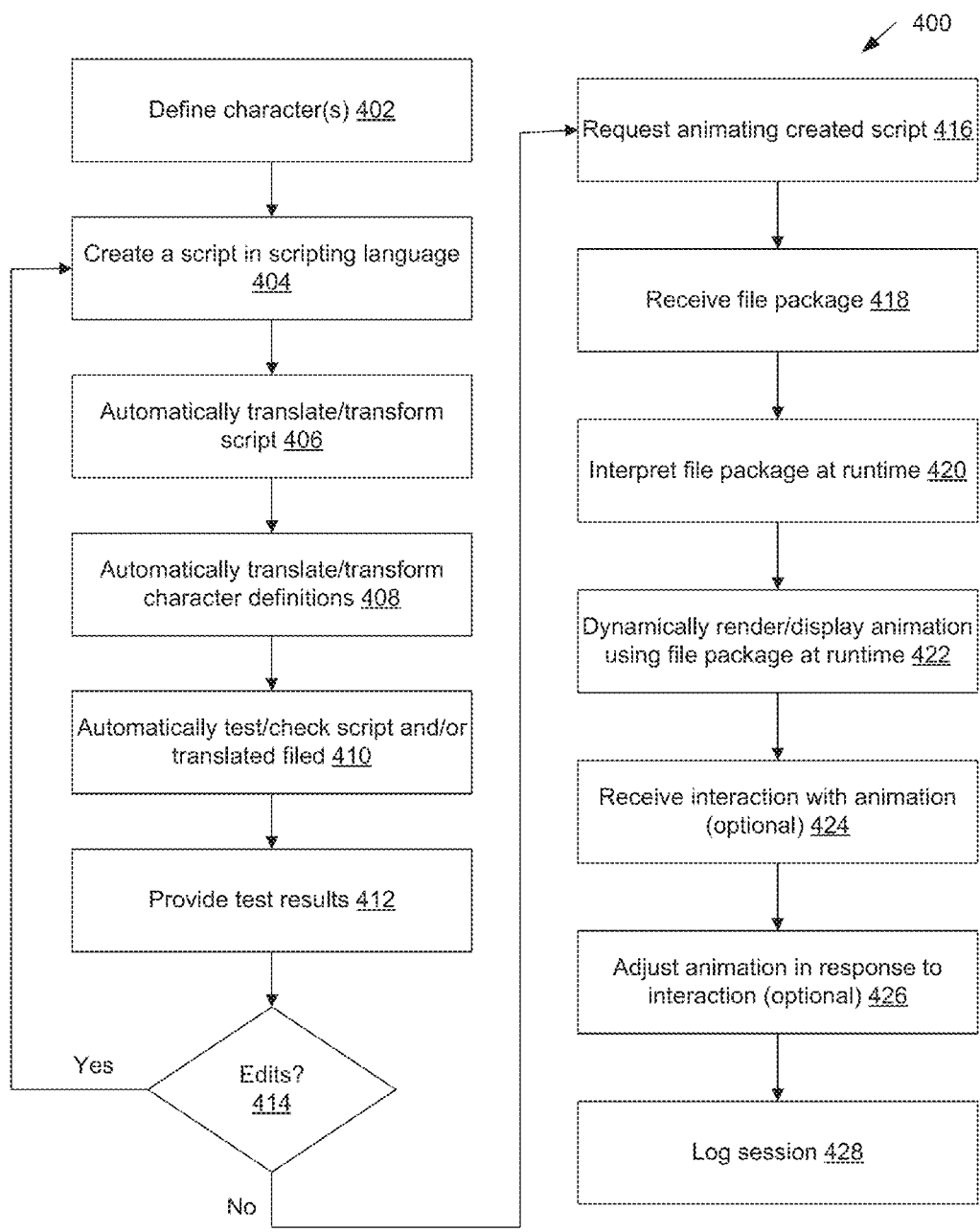
FIG. 4 illustrates an example flow performed in the system of FIG. 1, according to some embodiments.

FIG. 4 illustrates an example flow 400 to create and perform a script, according to one embodiment. In an embodiment, each of the processes described in connection with the functional blocks of FIG. 4 may be implemented using one or more computer programs, other software elements, and/or digital logic in any of a general-purpose computer or a special-purpose computer, while performing data retrieval, transformation and storage operations that involve interacting with and transforming the physical state of memory of the computer. Flow 400 of FIG. 4 is described below in conjunction with the objects and components of FIGS. 2-3.

Flow 400 relates to functionalities provided in connection with a user that creates or writes a script, such user referred to as an author user, authoring user, or author. Users that did not create a given script can also view performance of the given script, once the given script is released for general access (e.g., given script is designated as a published or production script). Performance of a script comprises rendering animated audio and/or visual elements specified by the script. Users capable of viewing or viewing performance of a script are referred to as viewing users, consuming users, or viewer users. Flow 400 is intended to be a high level overview. Additional details regarding blocks comprising flow 400 are discussed in the sections below.

In an embodiment, an author user accesses functionalities of blocks 402-414 on a portal or website hosted by the server 102 via a web browser application or an interpreter app included in a client 106. Block 402 comprises the character component 304, in conjunction with the user interface component 300, configured to define the character(s) to be included in a script based on character specifics inputted by the author user. Character definition includes, among other things, naming a character; selecting an avatar to graphically represent the character; selecting avatar clothes; selecting avatar accessories (e.g., eyeglasses, bag); modifications, if any, to avatar hair color, eye color, etc.; and the like. Block 402 may be repeated one or more times for each character to be included in the script.

Block 404 comprises the scripting component 306, in conjunction with the user interface component 300, configured to create a script in a scripting language. The author user writes the script, typically a chapter of a story, in a scripting language to be described in detail below.

Blocks 406,408 comprise the translation component 308 configured to automatically translate, transform, or convert the script and associated information (e.g., character definitions) into translated files. Block 406 comprises automatic translation of the script in the scripting language to another programming language or format that is executable by machines. In an embodiment, the script is translated to a JSON format to generate a JSON file (also referred to as a structured interpretation file, interpretation file, translated file, intermediate file, or intermediation file). Block 406 also comprises automatically translating the portions of the script, or the corresponding JSON file, specifying use of specific pre-defined items, such as a specific background, sound, music, character animation, outfit, etc., to CSV format to generate a chapter CSV file and one or more possible other CSV files.

Block 408 comprises the translation component 308 automatically translating the character definitions/characteristics (e.g., avatar selection, outfit, avatar modifications, etc.) to a CSV format. The character definitions/characteristics are generated independent of and outside of the script, in an embodiment. The translated character definitions are included in a character CSV file associated with the script.

Blocks 406 or 408 may be optional if, for example, no intermediate file (e.g., JSON file) is used or the script includes no characters, respectively.

In some embodiments, the information comprising the chapter CSV file may be added to an existing chapter CSV file. A single chapter CSV file may be maintained for all of the chapter scripts.

The JSON formatted file, chapter CSV file, and character CSV file (as necessary) are collectively referred to as translated files corresponding to a script.

Although not shown, each of these created data objects is stored in database 104 by store component 310. For example, in FIG. 2, the translated files corresponding to the chapter script file 214A are the JSON file 230A and chapter CSV file 234A.

Block 410 comprises the test component 312 configured to automatically test or check the created script and/or translated files for errors, inconsistencies, or other issues that may prevent rendering as animation. In an embodiment, a two-stage check is performed. The first stage comprises detecting errors in the created script itself, such as incorrectly formatted script elements (e.g., incomplete pairs of brackets or delineators). This may be similar to word processors automatically indicating spelling errors, grammatical errors, and the like. The second stage comprises detecting errors in the corresponding JSON file by running the test on the entire story associated with the created script, due to states that may carry over between chapters of a given story. The second stage test includes, among other things, testing all possible combinations of if/then logic and branching outcomes for possible logic failure. In an embodiment, the second stage test occurs only after the errors detected in the first stage are corrected. This is to avoid unnecessarily generating JSON files of scripts that are already known to contain errors.

Block 412 comprises the user interface component 300, in conjunction with the test component 312, providing the test results to the author user. If errors are found and/or edits are desired to be made to the character definition(s), outfit definition(s), and/or script for any reason, yes branch of block 414, then flow 400 returns to block 404 to enable edits by the author user. Otherwise no changes are made, no branch of block 414, and the script is ready for display as animation to at least the author user. At this point, the script may be considered to be in a pre-production or pre-publication stage, which means that the author user has full access to the script but non-author users may not have access to and/or be aware of the existence of the script. Alternatively, the created script may immediately publish without going through a pre-production or pre-publication stage.

In an embodiment, functionalities of blocks 416-428 are performed by the interpreter app or a simulator application included in a client 106. The particular client 106 used by the author user in connection with blocks 402-414 can be the same client or a different client used in connection with blocks 426-428. In the same (or single) client usage case, the client 106 may be a laptop or desktop. For example, on client 106a, the author user accesses the portal/website hosted on the server 102 via a web browser application included in the client 106a in connection with functionalities of blocks 402-414 (e.g., script creation), and uses a simulator application included in the client 106a in connection with functionalities of blocks 416-428 (e.g., viewing animation of the created script). In the same (or single) client usage case, the client 106 may be a tablet, smart phone, handheld device, or mobile device. As another example, on client 106b, the author user accesses the portal/website hosted on the server 102 via a web browser application included in the client 106b in connection with functionalities of blocks 402-414 (e.g., script creation), and uses an interpreter app included in the client 106b in connection with functionalities of blocks 416-428 (e.g., viewing animation of the created script). In the different (or two) client usage case, a script creation client may be a laptop or desktop and a script animation client may be a tablet, smart phone, handheld device, or mobile device. For example, the author user accesses the portal/website hosted on the server 102 via a web browser application included in the client 106a in connection with functionalities of blocks 402-414, and uses an interpreter app included in a different client device, client 106b, in connection with functionalities of blocks 416-428 (e.g., viewing animation of the created script).

Whether one, two, or more clients are used to create and view animation of scripts, the client 106 used by the author user to create a script may be referred to as an authoring client, authoring client device, authoring computing device, writer client, writer client device, writer computing device, script creation client, script creation client device, script creation computer device, and the like. Similarly, the client 106 used by the author user or non-author user to view the animation of a script may be referred to as a reader client, reader client device, reader computing device, viewing client, viewing client device, viewing computing device, and the like.

Block 416 comprises the author user selecting the created script to "read" and requesting the created script to be animated. The author user may wish to preview how the created script turned out, and after viewing the result, edit the script. A UI for interfacing with the author user may be locally provided at the client side. In some embodiments, to be described in detail below, the UI may be implemented using a JSON file and one or more CSV files associated with the client UI script file 220.

In response, the server 102 obtains and packages the files for animating the selected script. Block 418 comprises the interpreter/render component 316 configured to receive the file package. The file package includes a JSON file, a corresponding chapter CSV file, one or more supporting files (e.g., supporting files 240), and, in some instances, a portion or all of the contents of the library 254. If the necessary portions of or contents of library 254 are already maintained in client 106 used to view the created script, such content need not be packaged with the files. The file package is dynamically downloaded to the client of interest, and without any pre-configuration in preparation of rendering the animation. Alternatively, in some embodiments, the first chapter of a story may be pre-configured and/or pre-loaded for faster rendering.

Figure 5:
FIG. 5 illustrates an example screenshot showing an animated display on a client corresponding to a certain point in time in the runtime of a selected script, according to some embodiments.

Block 420 comprises the interpreter/render component 316 configured to interpret the file package at runtime to render or display the selected script in animation format. Block 422 comprises the interpreter/render component 316 configured to dynamically render animated audiovisual elements (e.g., visually animated characters, visually animated backgrounds, audio, visually animated character outfits, visually animated character animation/behavior, visually animated speech bubbles, etc.) corresponding to the script at runtime. The JSON file is executed at runtime, finding the necessary supporting or underlying data in the other files of the file package. FIG. 5 illustrates an example screen 500 showing an animated display on a client 106 corresponding to a certain point in time in the runtime of the selected script. The screen 500 includes a background 502, a first character 504, a second character 506, and a speech bubble 508 associated with the first character 504. Each of the first and second characters 504, 506 is represented by a particular avatar wearing a particular outfit (e.g., clothes and accessories) as specified by the authoring user in block 402.

If the script includes one or more interactive choices or branching logic, the author user interacts with the animation to continue viewing the story, in block 424. In response to the interaction action(s), the interpreter/render component 316 adjusts the animation in block 426.

During occurrence of blocks 416-426, one or more state data, user inputs, client response, server response, and other information about the session are logged in block 428. The log data is uploaded to server 102 for storage in the log file 250. In some embodiments, the log data can be used to enable consistency or persistence of interactive choice response(s) across more than one script (e.g., an interactive choice response made in a first script impacts the particular animation of a second script).

Blocks 416-428 associated with viewing animation of a script is also applicable to viewing users in general at their respective clients 106. When a viewing user, including a non-author user, selects a particular chapter or story within a story catalog presented to the viewing user, performance of blocks 416-428 occurs. In some embodiments, as described below, the viewing user is able to view animation of a chapter/script upon satisfying one or more criteria (e.g., valid user login, having sufficient number of viewing passes, etc.).

Although blocks 402-428 are shown in a certain order, it is contemplated that one or more of the blocks can be performed simultaneously or in a different order than shown. For example, block 410 may be performed prior to blocks 406, 408 if the testing comprises checking the script. As another example, block 428 may occur throughout the session (e.g., during performance of blocks 416-426).

In alternative embodiments, block 406 may be omitted if the script is rendered as animation without use of a translated/intermediate file (e.g., a JSON file). In this case, the file package received in block 418 may include the script or representation of the script data that is not a translation to a different computer language and which retains the natural language syntax/format of the scripting language. Blocks 420-422 may comprise interpreting and displaying/rendering using the script (or representation of the script data) and supporting files in the file package.

4.0 DEFINITION OF CHARACTERS

In an embodiment, the characteristics of each character in a given chapter script are defined by the author user via a series of UI screens provided at the author user's client 106 (e.g., client 106*a*) from the server 102. Defining character(s) in block 402 of FIG. 4 may be performed using a series of UI screens.

Figure 6A:
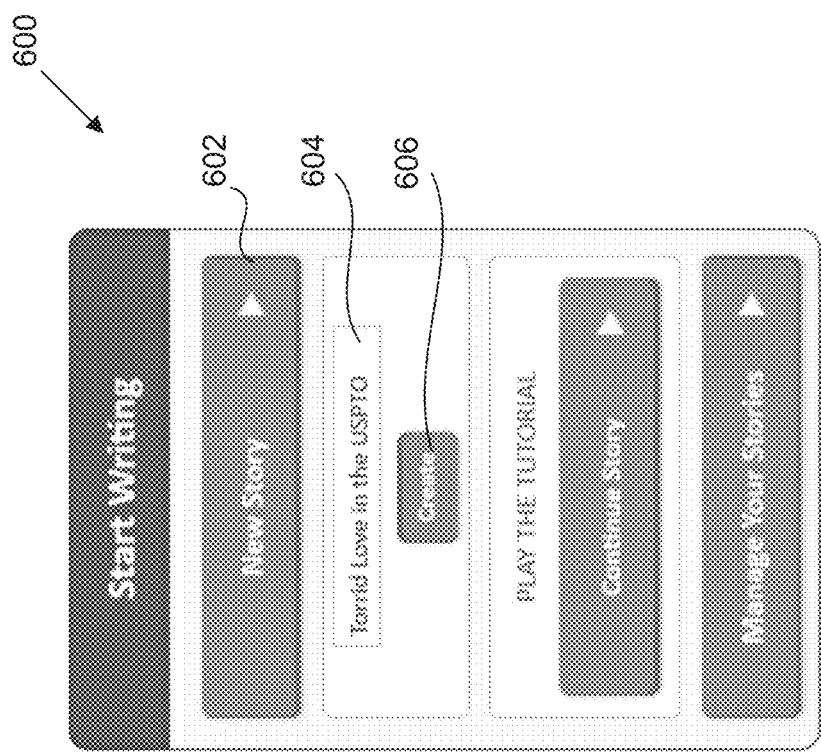
FIGS. 6A-6F illustrate example screenshots of the user interface (UI) used to define characteristics of a character in the system of FIG. 1, according to some embodiments.

FIG. 6A illustrates a portion of an example screen 600 to initiate creation of a new story. Since each story is organized into one or more chapters, creation of a new story comprises creation of chapter 1 of the story. By actuating a new story icon 602, a story name input field 604 is displayed to accept a name for the story. For example, the story name may be "Torrid Love in the USPTO." When a create icon 606 is actuated, a screen 610 in FIG. 6B is displayed.

Screen 610 includes a characters icon 612 to start specifying characteristics of a character or actor that will appear in chapter 1. Upon actuation of characters icon 612, a screen 620 of FIG. 6C is displayed. Screen 620 includes various UI elements to accept input of a character name in a character name input field 622, and to select an avatar to graphically represent the character via an avatar selection element 624 and/or 626. In screen 620, a character is named "Michelle Lee" and the "Charlotte" avatar is selected to represent the "Michelle Lee" character.

Although the selected avatar has certain default characteristics or attributes, such as certain hair color, skin color, body shape, and the like, one or more of these default characteristics can be changed by the author user. FIG. 6D shows a screen 630 that includes various avatar characteristics that can be changed by selecting modification choices provided in dropdown fields 632. For example, the avatar's hair color, hair style, face shape, skin color, eye shape, eye color, mouth shape, mouth color, body shape, and the like may be modified from the default settings. Upon saving these selections, the author user is returned to screen 610 of FIG. 6B.

Figure 6B:
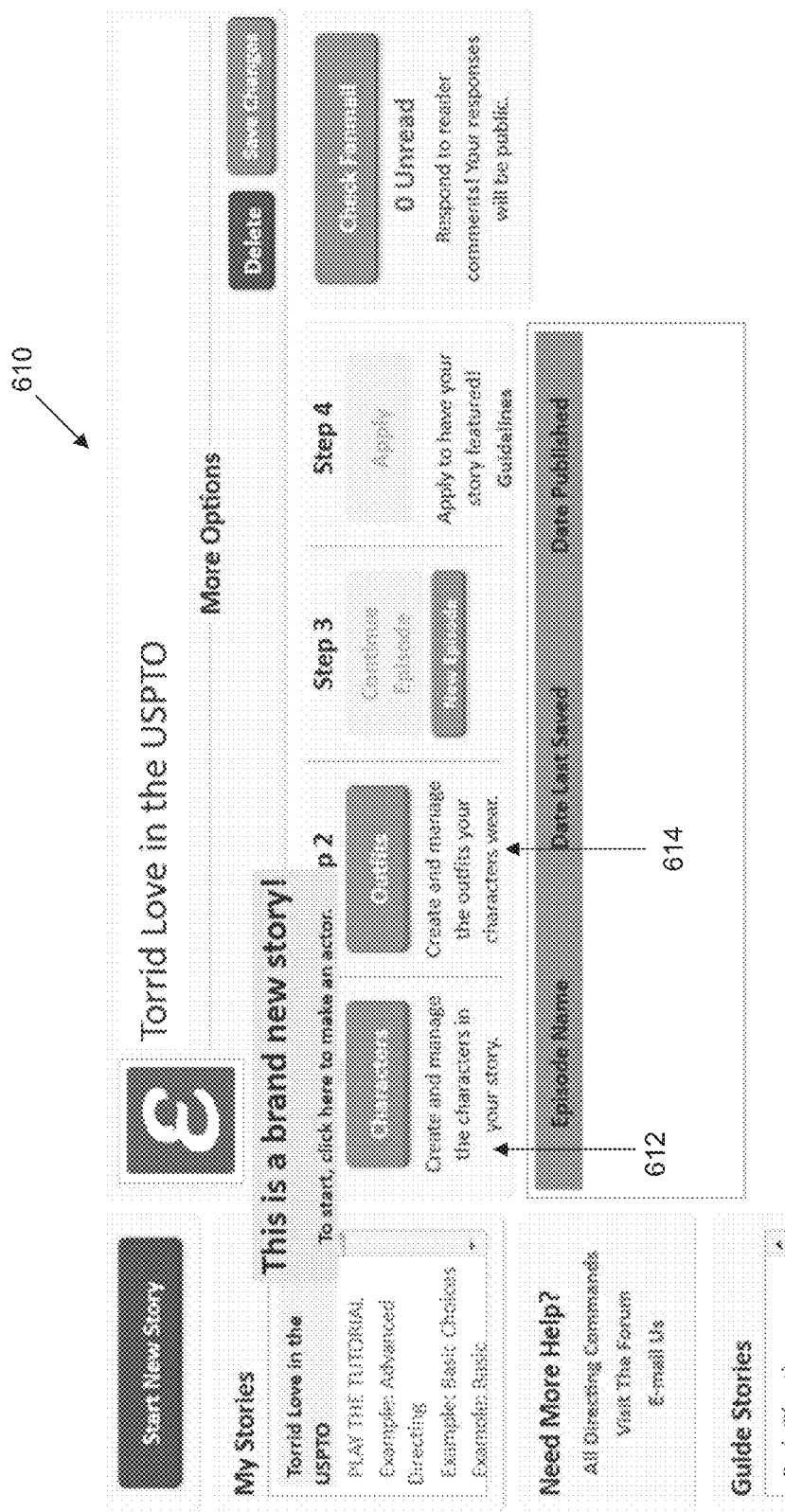
Figure 6C:
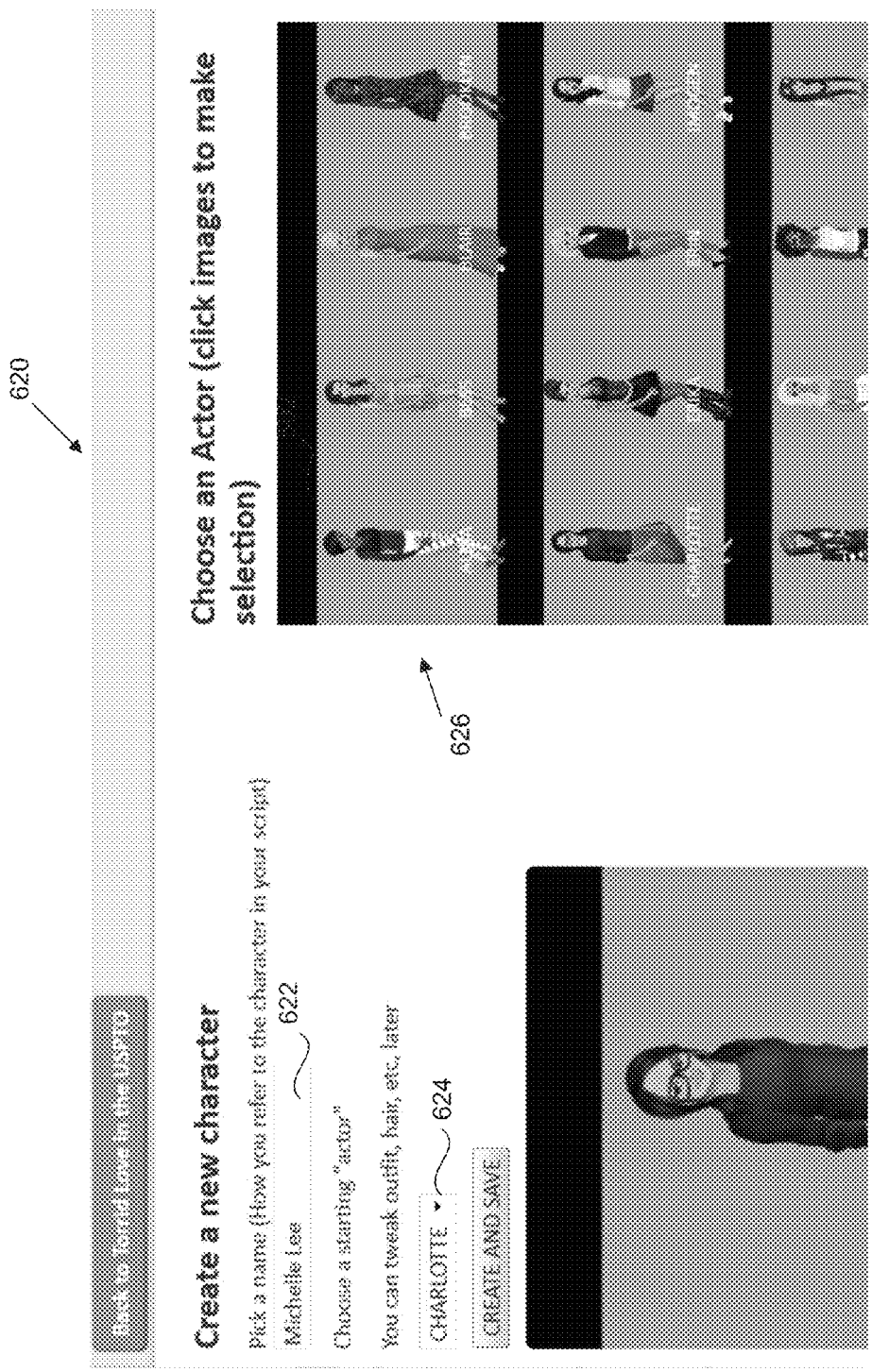
Figure 6D:
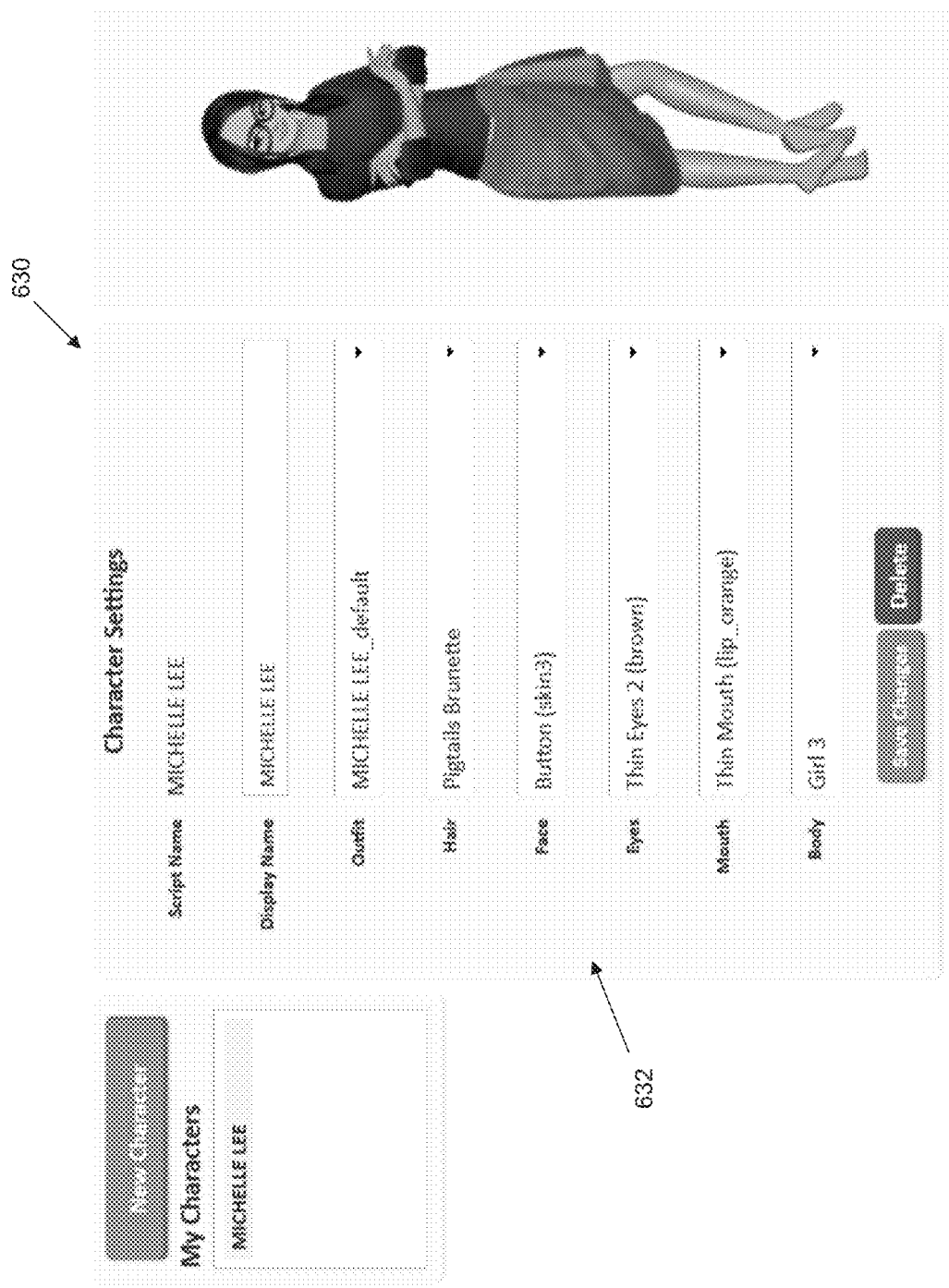
Figure 6E:
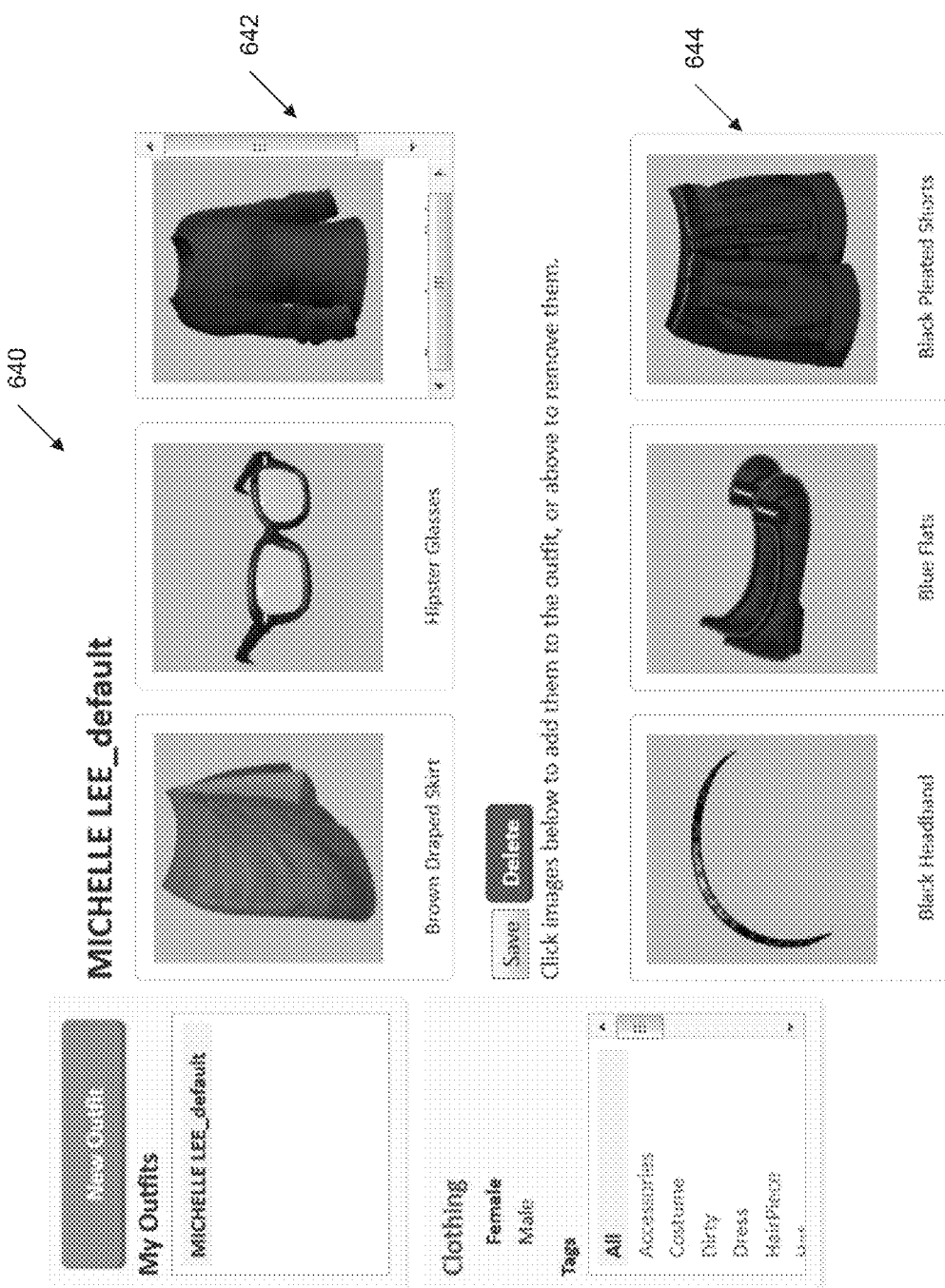

The avatar's outfit can be specified by actuation of an outfits icon 614 in FIG. 6B. In response, a screen 640 in FIG. 6E is displayed. Screen 640 permits modifications to be made to the selected avatar's outfit. An avatar's outfit includes clothing, shoes, and accessories, such as eyeglasses, hair accessories, and bag. The avatar's default outfit items 642 are displayed along with outfit modification choices 644. Upon saving any changes, the author user is returned to screen 610 of FIG. 6B.

Screens 620-640 are repeated one or more times to define characteristics of all the characters to appear in the script. Once character definitions are complete, writing the new story can commence by actuating a new episode icon 616 in FIG. 6B. In response, a screen 650 is displayed for the author user to compose the script. Screen 650 includes a script input section 652 and one or more scripting tools or aids 654, 656 to facilitate composing the script.

5.0 EXAMPLE SCRIPTING LANGUAGE

5.1 Example Scripting Language Format

In an embodiment, the scripts in the system 100 are written in a particular scripting language. The particular scripting language, also referred to as a script language, is readily understandable and useable by non-technical persons. The scripting language enables writing at least the dialog and stage actions in natural language syntax or format familiar in traditional script writing, provides for enablement of user interaction and particular responses to user interactions during performance of the script (e.g., choose your own adventure), and expanded uses outside of scriptwriting. The scripting language facilitates automatic transformation to computer animation via use of an intermediation language such as JSON. In some embodiments, the scripting language may be computer-readable and -executable and use of an intermediation language may be omitted.

The scripting language defines control of visual and/or audio elements, including dialog and stage actions, in the performance of a script. The scripting language enables incorporation of character definitions or characteristics into an existing animation/texture framework, in which the character definitions are generated independently and outside of the script in the scripting language format. In a broad sense, a script created in the scripting language resembles and reads like a movie or play script, but has the benefit of automatic transformation into animation. As discussed in detail below, the scripting language enables, but is not limited to, one or more of the following:

- Use avatars and backgrounds defined in a graphical user interface (GUI)
- Control visual elements (e.g., backgrounds, characters, positioning, overlay), animation and movement, dialog, sounds, music, and if/then logic
- Interactive choices
- Virtual currency/chapter passes, in which the monetization or access decisions can also be controlled by a script in the scripting language including being responsive to choices and if/then logic
- User-generated content is easily distributed to mobile devices that have the interpreter app installed.

The scripting language includes quasi-traditional cinematic scripting elements, code elements, and expanded-use elements. Quasi-traditional cinematic scripting elements comprise, but are not limited to:

- Dialog
- Background control
- Character placement or position
- Zoom
- Camera position
- Character actions (also referred to as character animation)
- Sounds and music
- Character outfit changes
- Simultaneous actions or directions.

The scripting elements above excluding dialog may be collectively referred to as stage directions, stage actions, or director commands. The quasi-traditional scripting elements are also referred to as statements, scripting statements, script statements, or quasi-traditional scripting elements. Accordingly, dialog may be referred to as a dialog statement, a stage action may be referred to as a stage action statement, and the like.

Code elements comprise, but are not limited to:
- Choice (if/then) logic
- Branching
- Complex branching
- Persistent state Code elements are also referred to as operators, logic, or logic constructs. For example, the choice logic may be referred to as a choice operator.

Lastly, expanded-use elements comprise one or more commands to facilitate viewing of scripts and/or to expand use of the scripting language to areas outside of storytelling. Expanded-use elements include, but are not limited to:

UI or catalog control
Web views
Access control (e.g., counters)
Monetization

The creation of a chapter script in block 404 of FIG. 4 comprises creating the chapter script by combining a plurality of these scripting language elements in any number of ways to tell a story. An example chapter script of the "Love Life" story is set forth herein in Appendix A.

An example dialog code from the example chapter script of the "Love Life" story comprises:

ELLA (talk_happy)
There you are! I thought I lost you.

The character name is in all capitalized letters and each line of dialog starts with a capitalized letter. Each line of dialog in the dialog code is rendered as a new speech bubble.

Examples of background control code from the example chapter script of the "Love Life" story comprise:

EXT.HEARTATTACK3-DAY
INT.CLUB-NIGHT

Specifying a background starts with "EXT" or "INT" for exterior or interior, respectively. Followed by a "." and then a background image name from among available background images, such as background files in library 254.

Figure 6F:
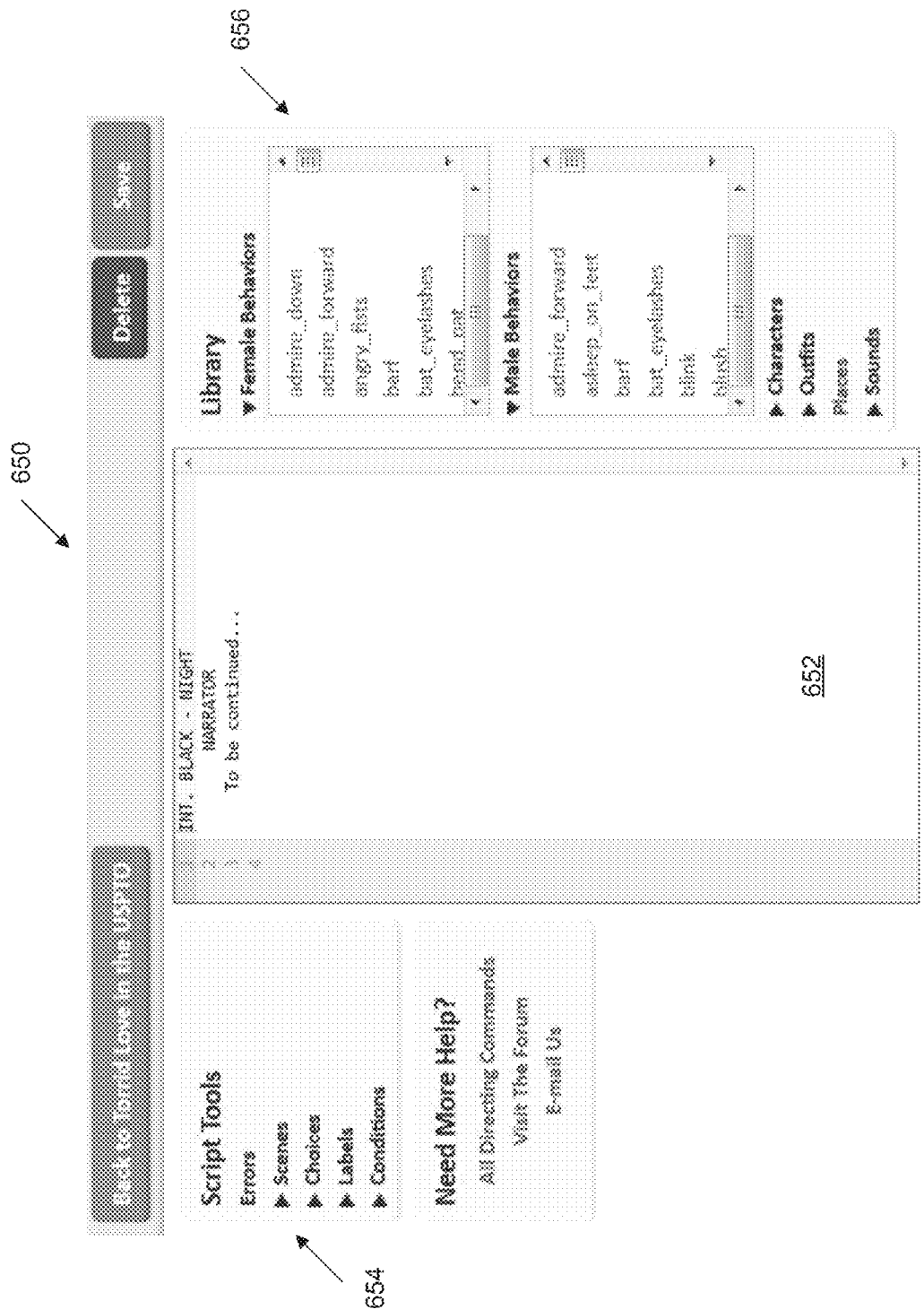

During creation of a script, the author user has access to a plurality of pre-defined character animations, character behaviors, music, sound, audio, backgrounds, outfits, and the like to select from for inclusion in the script. The plurality of pre-defined items is organized as respective files in the library 254 included in database 104. An example of a portion of the library items available is shown on the right side of screen 650 in FIG. 6F.

A plurality of character placement positions is possible in a scene. There are five default POSITIONS for character placement or position on the screen: screen left, upscreen left, screen center, upscreen right, and screen right. To place a character on screen in a certain position, the character placement code is formatted as follows:

@CHARACTER stands POSITION

The five POSITIONS can be refined by also specifying a zone, which is the background divided into a certain number of zones from left to right, such as zone 1, zone 2, zone 3, and zone 4. Examples of character placement code from the example chapter script of the "Love Life" story comprise:

@ELLA stands upscreen left in zone 1
@BIANCA stands screen right in zone 2

Users can further choose specific x- and y-coordinate positions by use of the following script format:

@CHARACTER spot SCALE X Y in zone A at layer Z.

An example use of this format is as follows:

@CHARACTER spot 0.5 50-250 in zone 3 at layer 1.

Characters can also be placed on or off screen by entering or exiting a scene. The code format to have a character walk onto the screen comprises:

@CHARACTER enters from SIDE to POSITION

And the code format to have a character walk off the screen comprises:

@CHARACTER exits SIDE

Examples of character placement code for scene exit/entry from the example chapter script of the "Love Life" story comprise:

@TRENCH enters from left to screen left
@BIANCA exits right

Characters can also move around the scene. The code format to have a character move around the scene comprises:

@CHARACTER faces SIDE

Or to have a character walk from his/her current position to a new position:

@CHARACTER walks to POSITION

Examples of character placement code for placement change from the example chapter script of the "Love Life" story comprise:

@DANCER3 faces right
@BIANCA walks to screen right

The default camera position is in zone 1. To move the camera to different zone, the camera can be panned from the current zone to a new zone using the following format:

@pan to zone X

Alternatively, the camera can be moved instantly to a new zone using the following format:

@cut to zone X

An example of camera placement code for from the example chapter script of the "Love Life" story comprises:

@cut to zone 2

A zoom command enables zooming in/out on characters and to cut and pan between close-ups of characters. Once at a certain zoom level, the perspective remains unchanged until the zoom level is changed. The zoom command format is as follows:

@zoom on CHARACTER to ZOOM % DURATION.

Example uses of the zoom command are provided below:

@zoom on TOO to 200% 1.5
@zoom to 100% in 1.0 (zoom to full screen)
@zoom to 100% in 0 (cut to full screen)

To cut to a ZOOM % or between characters, the zoom command is used with a duration of zero. Example of cutting to 150% zoom level:

@zoom on CHARACTER to 150% 0

Example of cutting between characters at 200% zoom level:

@zoom on CHARACTER1 to 200% 0
@zoom on CHARACTER2 to 200% 0.

To pan between characters, the zoom command is used to zoom to the character desired to pan to with the same ZOOM % as the character currently zoomed in on, with a desired DURATION:

@zoom on CHARACTER1 to 150% 2
@zoom on CHARACTER2 to 150% 2.

A zoom DURATION of 0.5, 2, and 3 are respectively considered to be fast, standard, and slow. A ZOOM % of 100%, 150%, and 250% are respectively considered to be standard, medium, and close-ups.

To have a character perform an action or animation while he/she delivers a line, specify a character action or behavior in parenthesis after the character name in the dialog code. An example is "(talk_happy)" included next to the CHARACTER name above for the dialog code. To have a character perform an action without dialog, the code format is as follows:

@CHARACTER is ACTION
@CHARACTER starts ACTION in which ACTION is selected from among a library of pre-defined actions or behaviors. Examples of character action codes without dialog from the example chapter script of the "Love Life" story comprise:

@DANCER1 is dance3
@BIANCA starts dance1

Note that ACTION is gender or body type specific, and will not be performed if there is a mismatch between the ACTION gender and the corresponding character avatar's gender.

Sound codes have the following format:
sound SOUND in which SOUND is a sound file selected from among a library of pre-defined sounds.

Music codes have the following format:
music MUSIC
music off in which MUSIC is a music file selected from among a library of pre-defined music or noise. Music files continue to loop until turned off.

Character outfits can be changed by code in the following format:
@CHARACTER changes into OUTFIT in which OUTFIT is an outfit file selected from among a library of pre-defined outfit definitions. An example of character outfit change code from the example chapter script of the "Love Life" story comprises:
@BIANCA changes into Mary An example of comments code in the example chapter script of the "Love Life" story comprises:
comments text Stage directions formatted to start with a "@" can be in compound form by using the AND construct between adjacent directions. An example of compound stage direction code from the example chapter script of the "Love Life" story comprises:
@DANCER1 is dance3 AND DANCER2 starts dance_rock AND DANCER3 is dance5 AND DANCER4 is dance3

Code elements of the scripting language enable implementation of if/then logic, branching, and persistent state functionalities not available in traditional scriptwriting. Use of if/then logic and/or branching allows the same user or different users to have different viewing experiences of the same version of a given script in different sessions. Use of if/then logic and/or branching also provides user interactive features during viewing of a script. This results in customization of the viewing experience for each user. The same if/then logic and/or branching are also operable to implement a client UI and/or script access/monetization policies of the system 100 at the client side. Certain of code elements facilitate persistency of user interactive actions and selections in one part of a script to another part of a script, in one chapter to another chapter of a story, in one story to another story, and/or from one user to another user. Additional details of code elements are discussed below.

In alternative embodiments, the scripting language may have additional commands or elements to facilitate storytelling and associated functionalities. For example, the scripting language made define control of visual, audio, vibrational, tactile, and/or other sensory-receptive elements in the performance of a script. As another example, rather than formulating character definitions separate from the script, character definitions may be defined within the script.

5.2 Example Transformation of Script to Animation

As discussed above in connection with block 406 of FIG. 4, in one embodiment the server 102 automatically translates, transforms, or converts a script created in scripting language to a file in meta-language format. In an embodiment, the meta-language format comprises a JSON format. Each script is transformed to a JSON file comprising a list of nodes. Each node within a JSON file is uniquely identified. The server 102 parses the script to identify and classify all of the scripting language elements present in the script based on the particular syntax and format associated with each of the various scripting language elements. For each type of the scripting language elements present in the script, there is a corresponding node type. Once the type of node is identified for a given scripting element, the discussion below sets forth the required content of the node, with the content values specified within the given scripting element.

Each node is delineated from each other by delineator symbol(s). The sequence of nodes is comma-separated and each node, in turn, contains attributes within curly brackets. For each node, there are a number of comma-separated attributes within the curly brackets. Each of the comma-separated attributes comprises a name-value pair. The name of an attribute is a word or a single letter enclosed within quotation marks separated from the value of the attribute by a colon, with the value of the attribute also enclosed within quotation marks.

Types of Nodes

One of the attributes of nodes is "c" which refers to the type of node. The type of node influences what other attributes may be present in the node. Types of nodes include the following:

default node—The default node does not have a "c" attribute specified but generally involves a character speaking dialog.

CostumeChangeNode—Used to change the outfit that a character wears

DirectorNode—Used to specify an action that describes character/movement animation ChoiceNode—Used to specify an interactive choice. This is often used for user experience branching (e.g., a different dialog or story based on choice).

FlagNode—Used to set a value. This node is often used in connection with a ChoiceNode to set a value based on user selection and then later to cause branching based on the BranchNode.

TimedFlagNode—Used to set a flag that is set for some time duration and then expires. This allows branching to change depending on whether the flag has expired.

LoseFlagNode—Used to unset a flag.

CounterSetNode—Allows a counter to be created with a value that can then be incremented or decremented and used in logic tests for purposes of branching CounterArithmeticNode—Allows counter to be increased or decreased BranchNode—Used to specify different branches in the story to take based on values that have been previously set using the FlagNode GlobalDictionaryNode—Used to alter which stories are visible in the catalog/list of stories CatalogConfigNode—Used to create a list of stories for a catalog WebViewNode—Allows script to refer to a web page which can then provide additional UI/functionality (including via Javascript)

Attributes

The names of possible attributes are as follows:

"k"—Key attribute, indicates the unique key or identifier of the current node. This attribute is included in all types of nodes.

"e"—Edge attribute, indicates the unique key or identifier of the next node for the interpreter app to process. This attribute is included in all types of nodes.

"p"—Person attribute, indicates the numerical identifier of the character to which this node relates, which has been loaded via CSV files, based on the characteristics defined for the character.
  Required attribute for default node and CostumeChangeNode
  Included in default nodes to identify speaker
  Included in CostumeChangeNode to identify character whose outfit will be changed
  If narrator is performing the dialog, then "NARRATOR" is the identifier "a"—Animation attribute that specifies the animation to be performed while dialog is spoken
  Generally included (but not required if there is no change/no animation to be performed) in default node
  A plurality of animations is available. Examples include:
    search, dance1, dance3, dance5, dance_rock, talk_happy, awkward, talk_headache, talk_shrug, idle, disappointed, chatting, wave, talk_greet, talk_arms_raised, condescending, smug, nervous, doubtful, rude, turnedoff2, laughing, talking, point, giddy, confused, phonecall, talkingonphone, talkingonphone2, talkingonphone3, talkingonphone4, excited, coveringmouth, bowing_front, walkrear, tinkering_rear, talking17_apathetic, talking9_happy2, primping "d"—Dialog attribute that specifies the dialog spoken by the character specified with the "p" attribute in default nodes
  Included in all default nodes
  In FlagNodes, "d" actually stands for debug and is an attribute that specifies debugging text.

"outfit"—Attribute specifying the clothing outfit that character "p" should wear as part of a CostumeChangeNode
  The clothing is specified by referencing as a value its identifier that is included in the applicable CSV files that relate to what was created on the portal.

"b"—Background attributes, indicates the name of the background image (defined using CSV files) to be used
  Only included if there has been a change
  Background attributes may be included in default node, CostumeChangeNode, DirectorNode "Action" Attribute for DirectorNode In addition to the "c", "k", and "e" attributes above, DirectorNode includes an "action" attribute. Each "action" attribute comprises a set of comma-separated values enclosed in square brackets. Depending on the type of "action" attribute, there may be different values included:
  "Put"—Places a character on screen, takes an unique identifier of a character and then a location
    Location includes "slot" and "spot" name/value pair, may include a "x" value
      "Slot"—One of the four zones that a scene is divided into
      "Spot"—Refers to descriptors of certain default locations in the scene. Example default locations include: upscreen_left, screen_right, back_far_left, back_far_right, back_right, back_left, offscreen_right, offscreen_left, screen_center
      "x"—Gives the number of pixels (positive or negative) offset from the default "spot" location that is given "Slot" and "spot" pairs also support specification of "y" and "z" coordinate values, similar to use of "x"
  "Face"—Causes character to face a direction
    Takes an identifier of a character and a numbered direction
    Directions: 0 (right), 1 (left)
  "Remove"—Takes an identifier of a character and removes from screen. Generally, this is done once character has been moved to off screen location.
  "Behave"—Runs an animation, takes a unique identifier of the character and the name of the animation
    The animations are those specified by the "a" attribute (discussed above).
  "Walk"—Takes a unique identifier of a character and a location and walks/moves character to that location
  "Follow"
    Takes an identifier of a character and a location (slot/zone/spot—see above under "Put" for description of location)
    Camera follows walking character to location/zone
  "Pan"—Camera cuts to zone/location
    takes an identifier of a location (slot/zone—see above under "Put" for description of location)
  "Sequence"
    This corresponds to the "@CHARACTER is ACTION" directive in the script.
    "Sequence" corresponds to script statements including a "THEN" operator/construct of the form @thing1 THEN thing2. An example script statement is: @CHARACTER faces left THEN @CHARACTER starts talking
    With "Sequence," rendering does not move onto the next action/node until the action is completed.
    By default, "Sequence" action takes another action as an argument (see the above actions) and then a default "Wait" action as an argument with a default time period (e.g., 1.5 seconds) that causes the rendering to wait until action is completed before moving onto the next node.
    Per the examples below, "Sequence" actions may also contain multiple actions to represent script patterns such as "@CHARACTER enters from left to screen right" or "@CHARACTER exits right"
  "Spawn"
    This corresponds to the "@CHARACTER is ACTION AND CHARACTER2 is ACTION2" directive in the script.
    With "Spawn," the actions are processed simultaneously. By default, "Spawn" action takes multiple actions as arguments that should be processed simultaneously.

Additional Attributes for Specific Types of Nodes

Certain types of nodes may have additional associated attributes:
ChoiceNode
  In addition to standard "a", "d", "k", "e", "c", and "p" attributes in default node, ChoiceNodes include the following additional attributes:
    "choices"—Lists the interactive choices that user can select in response to the question/statement stated in the "d" attribute if applicable
    "exprs"—For a ChoiceNode, if these values are true, then choice will be displayed. If you want all choices to be displayed, then set all of these to true. Otherwise, can use logic to influence which choices are available.

"es"—Edges attribute (e.g., plural). For a ChoiceNode, lists the next node the rendering should jump to depending on which choice is selected. This allows for branching based on whichever choice is selected.

"iaps"—This triggers an In App Purchase (IAP) purchase based on the IAP options that have been labeled. The dollar properties and other amounts would be set in a CSV file for each of the IAP labels. The logic for the application programming interface (API) call and verification of the IAP is handled by the interpreter app itself. It includes a set of comma-separated IAP options that correspond with the choices.

FlagNode

In addition to standard "k", "e", and "c", attributes in default node, FlagNodes include the following additional attributes:

"flag"—Includes a flag or value that will be used later in the branching if it has been set Often, based on choices in a ChoiceNode, the program is directed to a specific node (based on the "es" attribute and the choice selected) which is a FlagNode that sets a value that can be used for future branching/continuity based on prior choices selected For FlagNode, "d" represents debug text and the "p" is generally "NARK" for narrator.

TimedFlagNode

In addition to standard "k", "e", and "c", attributes in default node, TimedFlagNodes include the following additional attributes:

"flag"—Includes a flag or value that will be used later in the branching if it has been set "duration"—Number in seconds before flag expires For TimedFlagNode, "d" represents debug text and the "p" is generally "NARR" for narrator.

LoseFlagNode

In addition to standard "k", "e", and "c", attributes in default node, LoseFlagNodes include the following additional attributes:

"flag"—Includes a flag or value that should be unset

For LoseFlagNode, "d" represents debug text and the "p" is generally "NARR" for narrator.

BranchNode

In addition to standard "k", "e", and "c", attributes in default node, BranchNodes include the following additional attributes:

"exprs"—A list of conditions required for each branch

"es"—Edges attribute (e.g., plural). For a BranchNode, this contains an array of next nodes that the program should jump to depending on which of the corresponding "exprs" evaluate to true.

This allows for branching to continue later in the story based on flags/values that have been previously set.

Corresponds to if, elif, else syntax in the script

CounterSetNode

In addition to standard "k", "e", and "c", attributes in default node, CounterSetNodes include the following additional attributes:

"counter"—Value is the name of the counter that can be referred to and evaluated elsewhere, including in "expr" attributes of BranchNodes "value"—Value sets the value of the counter CounterArithmeticNode In addition to standard "k", "e", and "c", attributes in default node, CounterSetNodes include the following additional attributes:

"counter"—Value is the name of the counter that is to be changed

"kind"—Value is the operation to be performed on counter add for addition, sub for subtraction "value"—Value is the amount to be adjusted from the counter using the operation specified in "kind" attribute GlobalDictionaryNode In addition to standard "k", "e", and "c", attributes in default node, GlobalDictionaryNodes include the following additional attributes:

"gd_id"—Includes value of "catalog Visibility" when it relates to affecting visibility of stories "gd_key"—Includes the name of the story for which the visibility will be affected CatalogConfigNode In addition to standard "k", "e", and "c", attributes in default node, CatalogConfigNodes include the following additional attributes:

"catalog_list"—Value has a comma-separated list of stories to be included in such catalog "catalog_id"—Value includes the name of the catalog WebView Node In addition to standard "k", "e", and "c", attributes in default node, WebViewNodes include the following additional attributes:

"url"—Value includes reference to the Uniform Resource Locator (URL) of the web page to access Examples of various types of nodes generated in accordance with the node constructs specified above are as follows:

Default Nodes:

```
{
    "a":"talk_shrug",
    "p":"1009077",
    "k":"42",
    "e":"45",
    "d":"Never mind."
}

{
    "p":"NARRATOR",
    "k":"139",
    "e":"140",
    "d":"On Heart Attack three strapping suiters,"
}

{
    "p":"1030044",
    "k":"162",
    "e":"165",
    "d":"And I think you're just the single lady we want this season."
}
```

DirectorNode with "Put" Action:

```
{
    "action":[
        "Put",
        "6283473501290496",
        {
            "slot":"2",
            "spot":"back_left"
        }
    ],
    "c":"DirectorNode",
    "e":"17",
    "k":"16"
}
```

DirectorNode with "Behave" Action for Single Animation:

```
{
    "action":[
        "Behave",
        "6116367061221376",
        "dance_rock"
    ],
    "c":"DirectorNode",
    "e":"150",
    "k":"149"
}
```

DirectorNode with "Follow" Action:

```
{
    "action":[
        "Follow",
        "1009077",
        {
            "slot":"2",
            "spot":"screen_left"
        }
    ],
    "c":"DirectorNode",
    "e":"21",
    "k":"20"
}
```

DirectorNode with "Pan" Action:

```
{
    "action":[
        "Pan",
        "2",
        0.0
    ],
    "c":"DirectorNode",
    "e":"158",
    "k":"157"
}
```

DirectorNode with "Sequence" Action:

```
{
    "action":[
        "Sequence",
        [
            "Behave",
            "6556368341303296",
            "dance3"
        ],
```

-continued

```
        [
            "Wait",
            1.5
        ]
    ],
    "c":"DirectorNode",
    "e":"11",
    "k":"10"
}
```

DirectorNode with "Sequence" Action that Uses Multiple Actions to Represent the "@CHARACTER Enters from Left to Screen Right" in the Script:

```
{
    "action":[
        "Sequence",
        [
            "Put",
            "1009077",
            {
                "spot":"offscreen_left"
            }
        ],
        [
            "Face",
            "1009077",
            0
        ],
        [
            "Walk",
            "1009077",
            {
                "spot":"screen_right"
            }
        ]
    ],
    "c":"DirectorNode",
    "e":"253",
    "k":"252"
}
```

DirectorNode with "Sequence" Action that Uses Multiple Actions to Represent the "@CHARACTER Exits Right" in the Script:

```
{
    "action":[
        "Sequence",
        [
            "Face",
            "1009077",
            0
        ],
        [
            "Walk",
            "1009077",
            {
                "spot":"offscreen_right"
            }
        ],
        [
            "Remove",
            "1009077"
        ]
    ],
    "c":"DirectorNode",
    "e":"255",
    "k":"253"
}
```

ChoiceNode:

```
{
    "a":"idle",
    "c":"ChoiceNode",
    "d":"I'll have a",
    "exprs":[
        "true",
        "true",
        "true"
    ],
    "k":"48",
    "choices":[
        "Double vodka soda with salt",
        "Gin and tonic with a splash of diet coke",
        "Tequila and milk"
    ],
    "p":"1009077",
    "es":[
        "55",
        "65",
        "75"
    ]
}
```

ChoiceNode (with "iaps" Attribute):

```
{
    "styles":[
        "GREEN",
        "GREEN",
        "GREEN",
        ""
    ],
    "c":"ChoiceNode",
    "d":"You've used up your three free Episodes for today but you will have three more in [TIME_COUNTDOWN:DAILY_FLAG]. Would you like to purchase 3 Episode Passes instead of waiting?",
    "exprs":[
        "PURCHASES_0",
        "PURCHASES_1",
        "PURCHASES_MORE",
        "true"
    ],
    "k":"56",
    "iaps":[
        "IAP_1_PREMIUMCHOICE_1",
        "IAP_1_PREMIUMCHOICE_5",
        "IAP_1_PREMIUMCHOICE_10",
        ""
    ],
    "choices":[
        "Buy 3 Episode Passes for IAP_AMOUNT",
        "Buy 3 Episode Passes for IAP_AMOUNT",
        "Buy 3 Episode Passes for IAP_AMOUNT",
        "Tap here when the countdown is over to continue without purchasing any Passes"
    ],
    "p":"NARRATOR",
    "es":[
        "61",
        "72",
        "83",
        "12"
    ]
}
```

FlagNode:

```
{
    "c":"FlagNode",
    "e":"85",
    "d":"You gained a flag: DOUBLE_VODKA",
    "k":"60",
    "p":"NARR",
    "flag":"DOUBLE_VODKA"
}
{
    "c":"FlagNode",
    "e":"85",
    "d":"You gained a flag: DIET_COKE",
    "k":"70",
    "p":"NARR",
    "flag":"DIET_COKE"
}
{
    "c":"FlagNode",
    "e":"85",
    "d":"You gained a flag: TEQUILA",
    "k":"80",
    "p":"NARR",
    "flag":"TEQUILA"
}
```

TimedFlagNode:

```
{
    "c":"TimedFlagNode",
    "e":"18",
    "d":"You temporarily gained a flag: DAILY_FLAG 86400",
    "k":"17",
    "p":"NARR",
    "flag":"DAILY_FLAG",
    "duration":86400
}
```

LoseFlagNode:

```
{
    "c":"LoseFlagNode",
    "e":"20",
    "d":"You have lost a flag: PURCHASES_0",
    "k":"19",
    "p":"NARR",
    "flag":"PURCHASES_0"
}
```

CounterSetNode:

```
{
    "c":"CounterSetNode",
    "counter":"FREE_CHAPTERS",
    "e":"19",
    "k":"18",
    "value":"3"
}
```

CounterArithmeticNode:

```
{
    "c":"CounterArithmeticNode",
    "e":"31",
    "k":"29",
    "counter":"FREE_CHAPTERS",
    "kind":"sub",
    "value":"1"
}
```

BranchNode:

```
{
    "exprs":[
        "DOUBLE_VODKA",
        "DIET_COKE",
        "TEQUILA",
        "else"
    ],
    "c":"BranchNode",
    "k":"421",
    "es":[
        "424",
        "429",
        "434",
        "440"
    ]
}
```

The JSON file corresponding to the example chapter script of the "Love Life" story in Appendix A is set forth herein as Appendix B.

Translating the script in block 406 of FIG. 4 also may include identifying portions of the script, or corresponding JSON file, that specify items available from the library 254. The specified items can be, without limitation, identifiers of specific backgrounds, outfits, sounds, music, audio, character animation/behavior, and the like. For example, the "EXT.HEARTATTACK2-DAY" background identifier specified in the example chapter 1 of the "Love Life" story. The identified specified items, among other things, populate a chapter CSV file corresponding to the script/JSON file. The identified specified items in the chapter CSV file comprise a list of identifiers of things (e.g., backgrounds, outfits, audio, character animation/behaviors) that are further identified/resolved in other files (e.g., place CSV file, outfit CSV file, character spot CSV file). In an embodiment, a new chapter CSV file is created to correspond to a JSON file, the new chapter CSV file containing only information associated with the script. In an another embodiment, the specified items are added to an existing chapter CSV file, the existing chapter CSV file maintaining a record of all of the scripts (or all of the story scripts). The existing chapter CSV file may also be referred to as a composite or master chapter CSV file.

In block 408 of FIG. 4, the character definitions or characteristics specified by the author user (e.g., using a separate UI input process) are translated, transformed, or converted into a CSV format. The character definitions populate a character CSV file corresponding to the script/JSON.

The chapter CSV file comprises a table of one or more record rows, each record row associated with a particular chapter script. The table includes a plurality of columns to specify various data values associated with a particular chapter script. The columns comprise, without limitation:
  Chapter script identifier
  InBundle—Defines whether certain files require downloading or are already present
  Chapter script display name
  Script file name
  Timestamp
  Character identifier—Unique number assigned by server 102 for each user created character.
  Outfit identifier—List of outfits referred to in JSON file and refers to elements in the outfit CSV file.
  Places identifier—Name strings used in scripts
  Audio identifier—List of outfits referred to in JSON file and refers to elements in the audio CSV file.
  Character animation identifier—Name strings used in scripts
  Editable—Defines whether a viewing user can modify the animated script during viewing of the animation.
  Writers Mode—Defines whether to show debug tools available for the author user of the script.
  Lowest valid revision number Examples of data values populating a chapter CSV file are set forth herein in Appendix C. The chapter CSV file of Appendix C is a portion of a composite/master chapter CSV file. The record row corresponding to the example chapter 1 of the "Love Life" story is highlighted. If the chapter CSV file corresponding to a JSON file is configured to only contain data about the example chapter 1 of the "Love Life" story, for example, then the chapter CSV file may just include the row highlighted in Appendix C.

The chapter CSV file supports the JSON file by providing data values or translated data values not included in the JSON file.

In some instances, the chapter CSV file may itself include data values that require a further look-up. For example, the places identifier column of the chapter CSV file contains plain text names of background images and not the underlying image file name necessary to retrieve and use the image file. To find the specific image file name corresponding to a particular background/place name, a place CSV file is provided. The place CSV file is a file maintained independent of the scripts. The place CSV file provides the specific image file name (e.g., .jpg files) and, where applicable, also the specific overlay image file name (e.g., .png files), of all the possible background/place names available for use in a script. Each record row is associated with a particular background/place. The columns of the table comprise, without limitation:
  Background/place identifier—Name strings used in scripts
  InBundle—Defines whether certain files require downloading or are already present
  Image file name (e.g., .jpg file)
  Title file name—Reserved
  Overlay file name (e.g., .png file)—Not all backgrounds/places have an overlay
  Loop speed—Background images typically loop to maintain some kind of background in the scene. How fast to loop is defined by the loop speed.
  Scaled height—Defines the scaling of the image on the screen.

An example place CSV file is set forth herein in Appendix D. As an example, the Places identifier field of the chapter CSV file contains "EXT.HEARTATTACK2-DAY" as a background used in a script. To identify the actual image file for background "EXT.HEARTATTACK2-DAY," a look-up is performed in the place CSV file to find "HA_Splashcreen.jpg" is the actual image file name.

Similar to the discussion above for the place CSV file, one or more other CSV files and/or plists may exist and/or be generated to support look-up of underlying file names or items needed to animate the script. For example, the character identifier in the chapter CSV file refers to an avatar body and an outfit, each of which is a collection of images identified in another file. For a given script, at least a corresponding JSON file and chapter CSV file exist. In addition, one or more of the other CSV (or equivalent) files (e.g., supporting files 240) comprise, but are not limited to: a character CSV file, a place CSV file, an outfit CSV file, a character spot CSV file, an audio file, and possible other files. With the exception of the character CSV file, the remaining one or more of the other CSV (or equivalent) files may be non-script specific and used across all scripts available in the story catalog. The place CSV file identifies underlying image files for respective backgrounds. The outfit CSV file identifies underlying image files for respective outfits. The character spot CSV file identifies the pixel or screen coordinates for respective character placement positions. The audio file identifies underlying audio files for respective outfits. In some embodiments, the server 102 generates one or more CSV files in response to a request to view a particular chapter on a client 106 in addition to and/or instead of generating them in connection with creation of the JSON file associated with the chapter requested.

The interpreter app on the client 106 interprets and renders the animation specified by the chapter script dynamically and at runtime. The JSON file is interpreted at runtime, a node at a time, and dynamically reads in or consumes the CSV files (which contain avatar identification, clothing information, physical appearances, and the like). Dynamic look-up of data contained in the CSV file occurs to find or expose the underlying file names (e.g., exact image file names in .jpg format) associated with items identified in the JSON file, as necessary. With the underlying or exact file names of images and/or audio exposed to the JSON file, these underlying files are dynamically retrieved and dynamically loaded for dynamic rendering.

Character definitions/characteristics are dynamically constructed at runtime without having to reload the other animation data. They are dynamically loaded for incorporation into an existing animation-texture framework without having to know the character characteristics ahead of time. This is because there is separate configuration of characters from animation and texture data. The animation is built at runtime and takes as input, the configuration information that is loaded dynamically. Thus, among other things, a limitless number of characters and/or outfits can be introduced without changing anything in the binary and configuration file. The configuration file may also be changed to allow even more character and/or outfit variations without changing the binary.

The resulting animation displayed on the client 106 comprises animation with control of background, characters, positioning, overlays, movement, dialog (shown as speech bubbles), sounds, music, execution of if/then logic and branching, and persistency states. In an embodiment, the displayed animation comprises a type of animation referred to as paper doll animation. In paper doll animation, animating a character, for example, is performed using a skeleton with different parts of the character's body rendered using respective different image representation files (e.g., a hand is a first image file that is different from a body torso that is a second image file, etc.). As the character moves in adjacent frames, only those parts of the character's body that changes are re-rendered or redrawn while the unchanging body parts are not re-rendered or redrawn. In contrast, with frame-based animations, the entire character and/or frame may be re-rendered or redrawn if the character moves in adjacent frames. Thus, paper doll animation employed in the system 100 is considerably more memory and/or processor efficient. In an embodiment, animations are cached to avoid costs of loading, and the same animations can be used with different characters (which reduces loading and memory resources).

The file package sent to the client 106 to achieve such animation does not require any pre-rendering processing at the server side to decrease processing requirements at the client side. Nor is the interpreter app on the client 106 performing pre-rendering processing prior to runtime.

In some embodiments, the image files (also referred to as image representations) may be in one or more formats that are converted for use in paper doll animation techniques as described above.

Updates to a script can be immediately or nearly immediately pushed to update the client 106, or immediately or nearly immediately provided in response to a user request for the updated script. This feature enables the author user to make iterative changes to his/her script on client 106a (e.g., a web-connected laptop or desktop), and preview the change(s) in animation form in real- or near real-time on client 106b (e.g., a mobile device). In the context of reflection of script updates for non-author users, if a given script is updated while the given script is displaying on non-author users' client devices, assuming that the updated script is authorized for general access, the update is pushed to each of those client devices immediately or nearly immediately. The pushed update comprises a file package including an updated JSON file, one or more supporting updated CSV files, and one or more updated underlying item files in accordance with the update.

Because the scripting language enables display of visual elements as well as interactive choices, the same scripting language can also be used to create scripts that render the UI and/or implement monetization techniques on the clients 106. In an embodiment, the client UI script 220 (of FIG. 2) is created similar to the way a chapter script is created. Except it is created by system development or administration-type of personnel to serve as the client-side UI. Similarly, the access control script 224 is created to control access to chapter scripts by users via enforcement of a certain monetization policy. In this regard, scripts 220 and 224 comprise special scripts. However, because they are still scripts, they are transformed into respective JSON files and one or more CSV files, and packaged with necessary content, as discussed above with respect to "regular" chapter scripts. The file packages associated with the scripts 220 and/or 224 are downloaded to clients 106 upon the interpreter app being opened on respective clients 106. The download is transparent to the user that opened the interpreter app, and does not require selection of the script by the user. In some embodiments, the file package associated with script 220 and/or 224 may persist at the client 106 after the current session ends, for use at the next session. Additional details regarding scripts 220 and 224 are described below.

5.3 Virtual Stage Action Element Relating to Backgrounds

Backgrounds (also referred to as background graphical images) are received and stored in library 254 of database 104. Backgrounds are obtained by system personnel and/or provided by users.

Each background is divided into zones (also referred to as background graphical display zones). Each zone is a fixed width, such as the width of a smartphone screen, with no overlap between zones. A zone is the portion of the background viewable on the client screen, and may be referred to as the viewable area. Although background images can be of different total widths, most of the background images are of approximately the same total width. In an embodiment, most of the backgrounds are divided into four zones—zone 1, zone 2, zone 3, and zone 4 from left to right. Within each zone a character can be positioned in any number of locations as described above. In other embodiments, backgrounds may be divided into fewer or more than four zones.

The number or size of zones may be pre-defined or dynamic based on the screen characteristics of the client 106.

By default, zone 1 of a background is displayed when the background is specified in a script. Other zones of the given background can be viewed by moving the camera or a character to a different zone from the currently displayed zone. As discussed above, moving the camera using the code @pan to zone X causes the camera to pan across background zones, from the current zone to the specified new zone at a constant rate. Panning across two or more zones of a background may be considered to be an animated background.

To move the camera instantly to a new zone, the @cut to zone X code is used. Moving or placing a character in a different zone is achieved using: @CHARACTER stands POSITION in zone X. A character walking off screen and into a different zone is achieved by using: @CHARACTER walks to POSITION in zone X. A character walking to a different zone can be followed with the camera by using: @follow CHARACTER to POSITION in zone X. More than one character can walk together to a different zone using the AND construct in the following form: @follow CHARACTER to POSITION in zone X AND CHARACTER2 walks to POSITION in zone X.

In summary, commands related to moving the camera or character, which results in a change to the viewing area of the background, are as follows:

Placing characters at the start of a scene
    @CHARACTER stands POSITION
    @CHARACTER stands POSITION in zone X
Entering and exiting the scene
    @CHARACTER enters from SIDE to POSITION
    @CHARACTER exits SIDE
Moving a character
    @CHARACTER faces DIRECTION
    @CHARACTER walks to POSITION
    @CHARACTER walks to POSITION in zone X
    @follow CHARACTER to POSITION in zone X
Moving the camera
    @pan to zone X
    @cut to zone X
Compound or simultaneous movement actions using AND between the moving actions above.

The movement actions described above relate to affecting movement in the x- and/or y-directions (up-down, left-right). Movement is also possible in the z-direction, which is into or out of the stage or screen. Affecting movement in the z-direction, or more accurately in a 2-dimensional screen, changing stage depth may be achieved using the position commands with a position of non-standard depth (e.g., @CHARACTER walks to back left).

More than one background can be displayed simultaneously on a client screen. A first background can be overlaid over a second background with a certain transparency to affect simultaneous background display. In an embodiment, certain backgrounds are pre-defined as each comprising two or more backgrounds overlaid over each other in a certain order relative to each other (e.g., z-ordering), at a certain z-direction spacing relative to each other (e.g., z-spacing or z-offset), and certain x- and y-positions of the respective backgrounds relative to each other in the overlay set. The script code to use an overlay background set is the same as for a single background. The place CSV file specifies which background is an overlay set as well as the image file names of the plurality of backgrounds in the set. In other embodiments, specific script code may be configured to allow more control to select and assemble a plurality of single backgrounds as an overlay set.

Backgrounds available from the library 254 are static graphical images or dynamic graphical images. A dynamic image comprises an image having at least an area with one or more moving or animated elements and the remaining areas that are static or non-moving. Dynamic image backgrounds are consider to be animated backgrounds. For instance, a background of a room with a fireplace may include moving fire in the fireplace.

In an embodiment, a background is maintained in a scene at all times. If a background named in a script is smaller in total width than the standard four zones discussed above, for example, such that there is no or only a partial zone 4 for this background, then background looping is enabled to ensure that when zone 4 is called on to be displayed, some of the background will be displayed. Background looping may comprise cycling through or repeating the sequential (available) zones of the background, for example, when the background is scrolling behind a character to affect a walking character. In the example above, zone 1 of the background is the next section of the background displayed after whatever available portion of zone 4 is displayed pursuant to the background looping policy. As another example, if two or more backgrounds are displayed sequentially, then the first background, followed by the second background, looping back to the first background, and so forth can occur.

5.4 Use of Scripts for User Interactive Functionalities

Code elements of the scripting language comprise commands to include in the script to make animation corresponding to the script interactive.

Choice Operator

A choice operator or code element causes display of a list of text choices as respective button icons on the client device. The text in each of the button icons is specified by the author user in the choice operator construct. Each text choice is associated with a particular branch (delineated by a pair of curly brackets) in the choice operator construct. When the user selects one of the button icons corresponding to a text choice, the particular branch corresponding to the selected text choice is rendered on the client device. The user only sees the part of the script associated with the user-selected choice, and the non-selected choice is not rendered. After the selected choice branch, the separate branches merge back together and the script is the same regardless of the text choice selection. An example portion of a script showing use of the choice operator construct is as follows:

```
        TYLER
    What is your favorite color?
    choice
    "Pink" {
        YOU
        I like pink. It is super cute.
        Like bunnies!
        TYLER
        How predictable.
    } "Green" {
        YOU
        I like green.
```

```
            TYLER
        Me too.
} "Black" {
            YOU
        Black.
        Like the cold grip of death.
            TYLER
        That's dark.
}
            TYLER
        I'll keep that in mind when I'm buying your gifts!
```

In the above example, "Pink," "Green," and "Black" are the first, second, and third text choices, respectively; the content in the first pair of curly brackets is the first branch corresponding to the first text choice; the content in the second pair of curly brackets is the second branch corresponding to the second text choice; and the content in the third pair of curly brackets is the third branch corresponding to the third text choice. Three choice buttons are displayed on the client device: a "Pink" button, a "Green" button, and a "Black" button. Responsive to the button selected by the user, the corresponding branch content is rendered. Upon completion of rendering of a branch content, regardless of which branch it rendered, the next rendering is character TYLER's dialog "I'll keep that in mind when I'm buying your gifts!"

The above example is in no way limiting. The branch content can be dialog or other scripting elements (e.g., a stage action). The branch content can be one, two, or more scripting elements of the same or different types relative to each other. The branch content of one choice need not be the same length or script type as another choice in the same choice operator. The choice operator construct can comprise two or more text choices, as long as each choice is associated with a branch.

Save Choice Operator

A save choice operator is a more interactive version of the choice operator discussed above. The save choice operator has the same format as the choice operator with the addition of a variable name specified by the author use inside a pair of parenthesis next to the choice operator. When the user at the client device selects one of the text choices, the text of the selected choice is saved as the value of the variable name in the parenthesis.

```
            TYLER
        What is your favorite color?
choice (fav_color)
"Pink" {
            YOU
        I like pink. It is super cute.
        Like bunnies!
            TYLER
        How predictable.
} "Green" {
            YOU
        I like green.
            TYLER
        Me too.
} "Black" {
            YOU
        Black.
        Like the cold grip of death.
            TYLER
        That's dark.
}
            TYLER
        I'll keep that in mind when I'm buying your gifts!
```

```
            YOU
        Gifts huh?
            TYLER
        Yeah.
        I'll get you something nice and [fav_color].
```

In the example above, the variable is "fav_color" and the value of this variable will be "Pink," "Green," or "Black," whichever choice is selected by the user viewing at the client device.

Once the variable value is known and saved, it can be used elsewhere in the script. In an embodiment, the text of the selected choice is automatically included in dialog. In dialog occurring after the choice operation, dialog can be constructed to include the variable name in square brackets as a placeholder for the variable value. When dialog including the variable name in square brackets is rendered on the client device, the value of that variable name—which depends on the user selection of the particular text choice and which is saved text—is rendered on the client device.

In the example above, the last line of dialog includes the variable name: "I'll get you something nice and [fav_color]." When character TYLER speaks this line, the last word will be "pink," "green," or "black" based on the selected text choice in the save choice operation.

Branching

Once a user choice is saved (e.g., the variable corresponding to the choice is set), the variable can also be used to facilitate branching without first presenting choices and receiving a selection. In the example below, a branching operator, also referred to as if/then logic or if/then logic operator, is included in a script as follows:

```
            YOU
        Hi Tyler. Is that present for me?
            TYLER
        Yup. Open it.
if (fav_color is "Pink") {
            YOU
        A pair of pink bunny ears!
        So soft!
        Thanks! I love it.
} elif (fav_color is "Green") {
            YOU
        A $20 bill?
            TYLER
        Yeah, I didn't know what else to get.
        It's green at least!
} else {
            YOU
        It's empty.
            TYLER
        Black is the absence of light.
        Darkness is emptiness . . .
}
```

As with the choice and save choice operators, the user at the client device will only see the branch content corresponding to the favorite color previously selected from among the choices by the user. If the user selected "pink," then the dialog associated with the "green" branch and the "black" branch will not be animated in this session of the script animation.

Complex Branching

In addition to the branching operator, more complex branching is achieved using the goto command in conjunction with a corresponding label command. The goto command causes jumping to a different line in the script, with the landing point specified by the location of the corresponding label command in the script. This is a way to merge different branches back together. Because this is a true jump operation, any scripting that exists after the goto command and before the corresponding label command is skipped. Of course if other commands cause returning to the skipped part of the script, the skipped part will be animated.

The goto and label commands have the following format:
goto MERGE_THIS_BRANCH
label MERGE_THIS_BRANCH
in which MERGE_THIS_BRANCH is any name specified by the author user. An example script excerpt using the goto and label commands is as follows:

```
            ANGIE
        Where in the script should I go?
    choice
    "Far to the future" {
            ANGIE
        I'll go far into the future.
    goto FAR_FUTURE
    } "Where you are now" {
            ANGIE
        I'll just stay right where I am.
    }
            ANGIE
        See, where I am is really nice.
            NARRATOR
        Time passes.
    label FAR_FUTURE
            ANGIE
        Now I am in the future!
```

Another complex branching command is the gain command. This command saves where the viewing user has been in the script (e.g., whether a particular choice was selected by the user), and this can be used across different chapter scripts of a story or across different stories. The saved choice made by the user persists for continued storytelling across a plurality of scripts. One or more choices made by the user can be saved, one choice is saved per one gain command. The variable used to save the choice made in the save choice operator also persists across chapters of a story and across different stories.

In an embodiment, the gain command is located virtually anywhere within a script. For example, if a gain command is located within one of the choice branches, the gain command sets a flag if the user selects the choice associated with the particular branch in which the gain command is located. The gain command has the following format:
gain FLAG_NAME
where FLAG_NAME is any name specified by the author user.

In the following script example, the "MET_ROBERT_FROST" flag is set or gained if the user selects the "The road less taken" choice. The "MET_ROBERT_FROST" flag is deemed to be earned by the user:

```
            YOU
        A fork in the road . . . where should I go?
    choice "The normal road" {
            YOU
        So familiar and comforting!
    } "The road less taken" {
            ROBERT FROST
        Nice choice!
    gain MET_ROBERT_FROST
    }
```

Then the existence or absence of the "MET_ROBERT_FROST" flag can be checked and used elsewhere in the same or different script (e.g., in the same chapter, in a different chapter of the same story, or in a different story from the script that created the flag). An example script excerpt checking for the existence of the "MET_ROBERT_FROST" flag to carry out an if/then logic operation is as follows:

```
            HAYES
        How was your walk?
            YOU
        Really good.
        if (MET_ROBERT_FROST) {
            YOU
        I took a different route.
        And met a famous poet.
        } else {
            YOU
        I took my usual route.
        }
            HAYES
        Sounds fun.
```

Accordingly, interactive features are enabled in scripts using one or more of the code elements described above. The interactive features are similarly applicable in other context outside of animating chapter scripts. In an embodiment, the same code elements along with other graphical element display commands (e.g., stage action elements) are used to present and enable interactive functionalities of a client-side GUI and/or to control script access/monetization policy, as described in detail below.

As with the rest of the script, code elements of the scripting language are transformed into specific types of JSON nodes. And as with all JSON nodes, nodes corresponding to code elements are dynamically interpreted/read by the interpreter app included on the viewing user's client device; to affect dynamic loading of underlying files, as necessary; and to dynamically render audiovisual elements corresponding to the code elements at runtime. The interpretation and rendering operations are the same as discussed above for scripting elements.

In an embodiment, the user-selected choices are saved locally on the user's client device (e.g., client device 106b). Then at the end of the session (e.g., when the interpreter app is closed or the viewing of the current chapter is completed or stopped), the interpreter app packages the user-selected choices (e.g., variables in save choice operations, flags set in gain commands, etc.) along with other session data into a session log file. The log file is sent to the server 102 for persistent storage. The log component 314 of the server 102 organizes and stores the log file to one or more files in the database 104. As an example, the session log file may be persistently stored in the log file 250. The session log file is associated with at least a user identifier.

5.5 Use of Scripts to Control Client UI or Environment

In an embodiment, the interpreter app on the clients 106 lacks some or all of the capability to provide a GUI on its own. Instead, the client-side GUI, also referred to as the client UI, is supplied by a script, such as the client UI script 220. Thus, a particular script is responsible for generating the client UI that presents a (story) catalog of a plurality of other scripts (e.g., stories or chapters of stories). In an embodiment, a JSON file corresponding to the client UI script 220 along with supporting files are sent to the client 106 on which the interpreter app was just opened. When the JSON file is executed on the client 106 by the interpreter app, a client UI is provided on the client 106 that controls and modifies the interpreter app's UI and/or environment.

The client UI script 220 includes catalog commands and in some instances, if/then logic or choice operators. The catalog commands (also referred to as catalog declarations) define which stories or chapters are visible in the graphical depiction of a story catalog, which stories or chapters are invisible/hidden in the graphical depiction of the story catalog, which stories or chapters are listed as featured stories in the graphical depiction of the story catalog, which stories or chapters are listed as more stories in the graphical depiction of the story catalog, the story catalog header labels, story category list labels, to show or hide certain button icons in the client UI, and the like. The catalog commands transform to GlobalDictionaryNode and CatalogConfigNode in the corresponding JSON file. The GlobalDictionaryNode is used to affect the visibility of stories or chapters in the catalog (e.g., whether the names/titles of certain stories or chapters are to be included in the list of stories for the catalog). The CatalogConfigNode is used to create the list of stories or chapters for the catalog based on the visible stories designation.

An example client UI script 220 to display a catalog of stories or chapters available for consumption on a client 106 is reproduced below:
label loop
unhide stories
catalog show InAPerfectWorld
catalog show TheCaptainsDaughter
catalog show RocknRollRevolution
catalog show Stranded_v4
catalog show HiddenLives
catalog show TeaPoison
catalog show Area_51
we add back the hide button story
catalog show HideButton
catalog hide ShowButton
put all these unhidden stories in the more stories section, with the hide story on top
catalog headers Featured Stories|More Stories
catalog list Featured Stories |CampusCrush|love.life
catalog list More Stories|Rich_Witches|InAPerfectWorld|Stranded_v4|TeaPoison|TheCaptainsDaughter|RocknRollRevolution|HiddenLives|Area_51|HideButton|+Contact|+Legal
jump menu+catalog
goto loop The corresponding JSON file is reproduced below:
{"nodes":[{"c":"GlobalDictionaryNode","e":"5","gd_id":"catalogVisibility","gd_key":"InAP erfectWorld","k":"0","gd_value":"V","label":"loop","gd_op":"set"},{"c":"GlobalDictionaryN ode","e":"6","gd_id":"catalogVisibility","gd_key":"TheCaptainsDaughter","k":"5","gd_value":"V","gd_op":"set"},{"c":"GlobalDictionaryNode","e":"7","gd_id":"catalogVisibility","gd_k ey":"RocknRollRevolution","k":"6","gd_value":"V","gd_op":"set"},{"c":"GlobalDictionaryN ode","e":"8","gd_id":"catalogVisibility","gd_key":"Stranded_v4","k":"7","gd_value":"V","gd_op":"set"},{"c":"GlobalDictionaryNode","e":"9","gd_id":"catalogVisibility","gd_key":"Hid denLives","k":"8","gd_value":"V","gd_op":"set"},{"c":"GlobalDictionaryNode","e":"10","gd_id":"catalogVisibility","gd_key":"TeaPoison","k":"9","gd_value":"V","gd_op":"set"},{"c":"GlobalDictionaryNode","e":"12","gd_id":"catalogVisibility","gd_key":"Area_51","k":"10","gd_value":"V","gd_op":"set"},{"c":"GlobalDictionaryNode","e":"13","gd_id":"catalogVisibility","gd_key":"HideButton","k":"12","gd_value":"V","gd_op":"set"},{"c":"GlobalDictionar yNode","e":"16","gd_id":"catalogVisibility","gd_key":"ShowButton","k":"13","gd_value":"H","gd_op":"set"},{"c":"CatalogConfigNode","catalog_list":["Featured Stories","More Stories"],"k":"16","catalog_id":"default","catalog_op":"header","e":"17"},{"c":"CatalogConf igNode","catalog_list":["CampusCrush","love.life"],"k":"17","catalog_id":"Featured Stories","catalog_op":"section","e":"18"},{"c":"CatalogConfigNode","catalog_list":["Rich_Witches","InAPerfectWorld","Stranded_v4","TeaPoison","TheCaptainsDaughter","RocknRo llRevolution","HiddenLives","Area_51","HideButton","+Contact","+Legal"],"k":"18","catalo g_id":"More Stories","catalog_op":"section","e":"20"},{"c":"JumpNode","e":"0","d":"menu+catalog","me nu":"catalog","k":"20","p":"NARR"},{"k":"end","c":"EndNode","d":"The End","label":"the_end"}],"version":"zzz","chapter_id":"ShowButton/1","revision":19}

Because the client UI script 220 is a script, the server 102 performs translation to convert it into a JSON file. The server 102 also performs the other operations described above to send a file package for rendering the client UI script 220 on the viewing user's client 106. The client 106 interprets the received JSON file and supporting file(s) at runtime and dynamically renders animation corresponding to the client UI script 220, as described above for other file packages.

Figure 7:
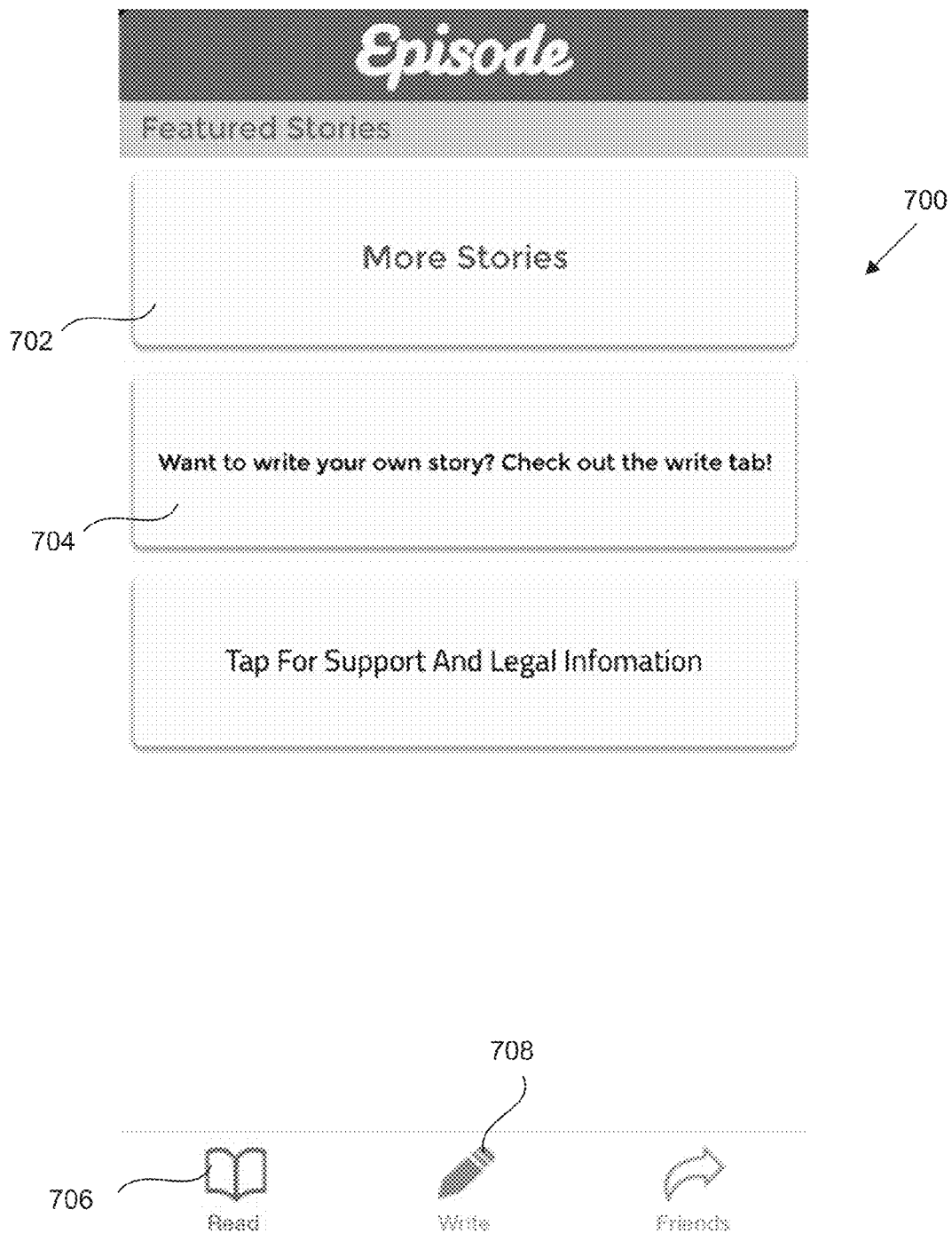
FIG. 7 illustrates an example screenshot showing client UI elements displayed on a client driven by an embodiment of a client UI script, according to some embodiments.

FIG. 7 illustrates an example screen 700 showing client UI elements displayed on a client 106 driven by an embodiment of the client UI script 220. Screen 700 includes one or more button icons: a featured stories "more stories" button 702 (e.g., for users to "read"/view more stories that are currently designated as featured stories), and a write button 704 (e.g., for users to write their own stories). Screen 700 also includes one or more (main) menu-type icons: a read icon 706 (e.g., for users to "read"/view more stories, which may include all available stories that are more expansive than the featured stories), and a write icon 706 (e.g., for users to write their own stories). The content of screen 700 is not intended to represent all possible client UI elements. Instead, screen 700 illustrates one or more example client UI elements that may be presented, which can be arranged in any number of ways in one or more menus/screens. As an example, when a user clicks, taps, or otherwise actuates the "more stories" button 702, another screen is presented on the client 106 showing a list of the featured stories for selection by the user.

5.6 Use of Scripts for Web View

In an embodiment, the scripting language includes a web view command to refer to a Uniform Resource Locator (URL) associated with a web page within a script. The web page provides additional functionalities, such as, but not limited to, provide additional UI elements, change UI elements, change the state of the database 104, perform tests (e.g., timegate test), and/or check certain conditions or states of the user's client 106. The web view command may be included in a chapter script of a story; and hence, the web page referenced in the web view command may be associated with the story. The web view command may alternatively be included in a script that is not part of a story; but is instead, a script written for non-storytelling purposes. The web page(s) referred to in scripts may be hosted by the server 102. The web view script file 222 in FIG. 2 is an example of a script including at least one web view command.

The web view command has the following format:
webview URL
where URL is the URL associated with a web page.

An example script is reproduced below, including a web view command that references a web page "http://www.example.com":

```
webview http://www.example.com
INT. BLACK - NIGHT
    NARRATOR
        Welcome to the timegate test!
        This is Episode 1.
        You like it?
    choice
    "Yes, lovely" continue
    "No, ugly" continue
    NARRATOR
        Ok then. Ready for Episode 2?
```

As with all scripts, server 102 transforms scripts including a web view command to a corresponding JSON file and also generates one or more CSV files to support the JSON file. And as discussed above, the server 102 packages the necessary files and sends the file package to the client 106 on which the script including a web view command is to be rendered. The corresponding JSON file for the script above is provided below:
{"nodes":[{"url":"http://www.example.com","c":"WebViewNode","e":"5","k":"0"},{"p":"N ARRATOR","k":"5","b":"INT. BLACK—NIGHT","e":"6","d":"Welcome to the timegate test!"},{"p":"NARRATOR","k":"6","e":"7","d":"This is Episode 1."},{"c":"ChoiceNode","d":"You like it?","exprs":["true","true"],"k":"7","choices":["Yes, lovely", "No, ugly"],"p":"NARRATOR","es":["13","13"]},{"p":"NARRATOR","k":"13","e":"end","d":"O k then. Ready for Episode 2?"},{"k":"end","c":"EndNode","d":"The End", "label": "the_end"}], "version": "_g1FgjudG7m", "chapter_id": "timegate/1","revision":3}

The web view command can be located virtually anywhere in a script, including within branches of choice operations, branching operations, and other interactive choice operations. The interpreter app at the client-side executes the JSON node corresponding to the web view command (WebView Node) by requesting at runtime the web page specified by the URL via a web browser application also included at the client-side. When the web page loads on the client-side, the web page may take partial or full control. The interpreter app executes the next node when the web page indicates that execution may resume.

5.7 Use of Character Characteristics

As discussed above, characters and other elements such as starting outfits for a given script may be defined using a GUI environment on the portal hosted by the server 102. When the author user creates a character (e.g., defines a character name, avatar, and changes to default avatar characteristics), the server 102 saves the character with a unique identifier (e.g., a unique character number) and associates it with one or more particular scripts. An outfit, a particular combination of clothing and accessories, for the created character is also saved by the server 102 with a unique identifier (e.g., a unique outfit number) and is associated with at least the created character. Additional character characteristics may also be defined. These actions are repeated for each character to appear in a chapter script.

Then as the author user composes the chapter script that includes the created character(s), the portal provides a library of a plurality of pre-defined outfits (each with a specific identifier) and a plurality of pre-defined character animations or behaviors (each with a specific identifier) from which the author user can select to include in the chapter script. The portal also provides the list of outfits created by the author user for the chapter script or story including the chapter script for selection by the author user.

Hundreds of character animation/behaviors are available. A few examples are provided below in the specific identifiers assigned by the server 102 and which are displayed to the author user for selection during script creation:

search, dance1, dance3, dance5, dance_rock, talk_happy, awkward, talk_headache, talk_shrug, idle, disappointed, chatting, wave, talk_greet, talk_arms_raised, condescending, smug, nervous, doubtful, rude, turnedoff2, laughing, talking, point, giddy, confused, phonecall, talkingonphone, talkingonphone2, talkingonphone3, talkingonphone4, excited, coveringmouth, bowing_front, walkrear, tinkering_rear, talking17_apathetic, talking9_happy2, primping.

One or more character animation/behaviors may be animated simultaneously, using the AND construct/operand discussed above. The corresponding JSON expression is the "Spawn" attribute in the DirectorNode, which causes actions to occur simultaneously. An example JSON node for rendering simultaneous character animation/behaviors is shown below. Four simultaneous character animation/behaviors—dance3 for a first character, dance_rock for a second character, dance5 for a third character, and dance3 for a fourth character—are specified below.

```
{
    "action":[
        "Spawn",
        [
            "Sequence",
            [
                "Behave",
                "6556368341303296",
                "dance3"
            ],
            [
                "Wait",
                1.5
            ]
        ],
        [
            "Behave",
            "6116367061221376",
            "dance_rock"
        ],
        [
            "Sequence",
            [
                "Behave",
                "6306353865818112",
                "dance5"
            ],
            [
                "Wait",
                1.5
            ]
        ],
```

-continued

```
[
    "Sequence",
    [
        [
            "Behave",
            "6283473501290496",
            "dance3"
        ],
        [
            "Wait",
            1.5
        ]
    ]
],
"c":"DirectorNode",
"e":"161",
"k":"158"
}
```

Outfits and character animation/behaviors are body type specific, in an embodiment. For example, a character represented by an avatar having a female body requires female outfits and female character animation/behaviors. Similarly, a character represented by an avatar having a male body requires male outfits and male character animation/behaviors. If there is a mismatch in gender among the avatar, outfit, and/or character animation/behaviors, then the interpreter app may not render the mismatching combination. More likely, the test component 312 will detect mismatches during a check/test of the chapter script and require fixing the error before continuing to the next phase. In alternative embodiments, the outfits and/or character animation/behaviors are not body type specific and/or may be deemed a permissible combination with each other and/or a character avatar based on other criteria.

In an embodiment, there are three distinct character-related characteristics:
  a character definition specified by a unique character number,
  an outfit definition specified by a unique outfit number, and
  a character animation/behavior specified by a unique textual identifier.

Because the interpreter app dynamically renders characteristics of characters into an existing animation-texture framework, as discussed above, dividing the characteristics of each character into at least three parts allows only those characteristics that are newly displaying or changing to be rendered rather than re-rendering everything about a given character. Correspondingly, only those image and/or audio files associated with the particular characteristics to be rendered are identified via CSV files and dynamically loaded for display by the interpreter app at runtime. For example, if a character's animation/behavior changes while on-screen, only the image and/or audio file(s) corresponding to the new character animation/behavior is newly rendered.

Additional details relating to format and use of the scripting language is set forth herein in Appendix E.

6.0 CLIENT-SIDE SCRIPT EDITS

As discussed above, the use of a variable in the save choice operator to save a text choice made by a viewing user and then using the variable to affect some of the dialog in the same or different script at runtime comprises client-side editing of dialog. The result is that users at the client-side can edit the dialog at runtime by selecting a choice, which causes replacement of the variable included in dialog with text corresponding to the variable during animation of the script. The user edited dialog immediately becomes part of the current animation of that script at his/her client device. Thus, although a user who did not author a given script does not have rights to edit the given script per se, the save choice operator in conjunction with use of variables in dialog constructs in the given script enables other users to "edit" the given script. And such "editing" takes place on the client-side via the interpreter app and are reflected immediately on the "editing" client device.

In other embodiments, the scripting language enables real-time or near real-time multi-player functionality. A first user at a first client 106 can enter (or select) text during viewing of a script, and the entered/selected text appears in a script being animated for a second user at a second client 106.

7.0 MONETIZATION USING SCRIPTS

In an embodiment, viewing users' access to story chapters at the clients 106 are controlled using counter commands and/or flag commands included in a non-story script. The access control script file 224 in FIG. 2 is an example of such a non-story script. An access control script 224 is generated for each user that opens the interpreter app at his/her respective client 106, and is sent to the user's client 106 from the server 102. The interpreter app lacks the capability to provide the gating function and associated UI on its own. Instead, the access control script 224 provides the feature.

The access control script 224 includes a current counter value associated with the particular user interfacing the client 106. The current counter value is maintained in the user information file 252. A counter or chapter pass counter is associated with each uniquely identifiable viewing user (e.g., by login info on the interpreter app). The current counter value for a given viewing user represents the number of passes (also referred to as chapter passes) currently credited to, and thereby available for use by, the given viewing user.

One pass is used to access a single chapter from among a catalog of chapters available to read provided on the interpreter app. Alternatively, different pass to chapter redemption ratios may apply. Access to chapters is contingent on the viewing user having sufficient number of passes in his/her "account." The passes represent virtual currency in the system 100. Passes can be purchased with real currency by viewing users and/or passes can be earned or rewarded. Thus, the access control script 224 controls monetization of stories and more particularly, chapters of stories. Note that passes are not needed for an authoring user to access his/her chapters at least for previewing newly created chapter scripts. In some embodiments, no passes are also needed for the authoring user to access his/her chapters in the regular viewing of those chapter(s).

The access control script 224 includes interactive scripting commands (e.g., if/then logic, choice, branching) and either counter commands or flag commands. The interactive scripting elements are used to enable interaction with and presentation of one or more monetization statements to the viewing user. The counter or flag commands are used to check the counter value associated with the viewing user and to change the counter value in accordance with the viewing user's choices and actions. The counter used in the access control script 224 is set with the current counter value associated with the viewing user. The counter setting command corresponds to the JSON CounterSetNode described above. Based on the viewing user's action(s), the counter is incremented or decremented. The CounterArithmeticNode facilitates the increment or decrement of the counter. Alternatively, the counter can be set using flags, in which the flag command corresponds to the JSON FlagNode described above. The FlagNode can be used in connection with a ChoiceNode to set a value based on the viewing user's selection and then cause branching using BranchNode.

An example access control script 224 is set forth herein in Appendix F. In this example, the viewing user is given three free passes a day. Before the viewing user can "read" a chapter from the catalog, the script logic checks if the counter value is greater than zero. If the counter value is greater than zero, then the viewing user can access a chapter from the catalog. If counter value is too low (e.g., zero), then the script includes choices for the viewing user to purchase passes (e.g., in sets of three passes). If the viewing user selects the choice to purchases passes, then the script logic (e.g., branching operator) presents one or more purchasing choices to the viewing user for selection. In an embodiment, the passes may be purchased using real or virtual currency (e.g., IAPs). There may be a separate API call made by the interpreter app to charge or otherwise complete the purchase in real currency. Additional details regarding IAPs are described above.

If passes are purchased, the counter is incremented accordingly. In the example, the "iaps" attribute of the ChoiceNode is used to increment the counter or, if flags are used, to set a flag. Similarly, if the viewing user reads a chapter, the counter is decremented or, if flags are used, to set a flag corresponding to a decrement.

The viewing user's behavior other than a pass purchase can cause the counter to be incremented (or flag equivalent). For example, if the viewing user answers a question correctly, provides feedback about a read chapter or story, the viewing user's referral of certain chapters to other users was successful, and the like. Passes accrued in this manner causing the counter (or flag equivalent) to change is handled the same way as counter increment (or flag equivalent) in response to a pass purchase.

Because the access control script 224 is still a script, the server 102 performs translation to convert it into a JSON file. The JSON file corresponding to the script shown in Appendix F is set forth herein in Appendix G. The server 102 also performs the other operations described above to send a file package for rendering the access control script 224 on the viewing user's client 106. The client 106 interprets the received JSON file and supporting file(s) at runtime and dynamically renders animation corresponding to the access control script 224, as described above for other file packages.

Figure 8:
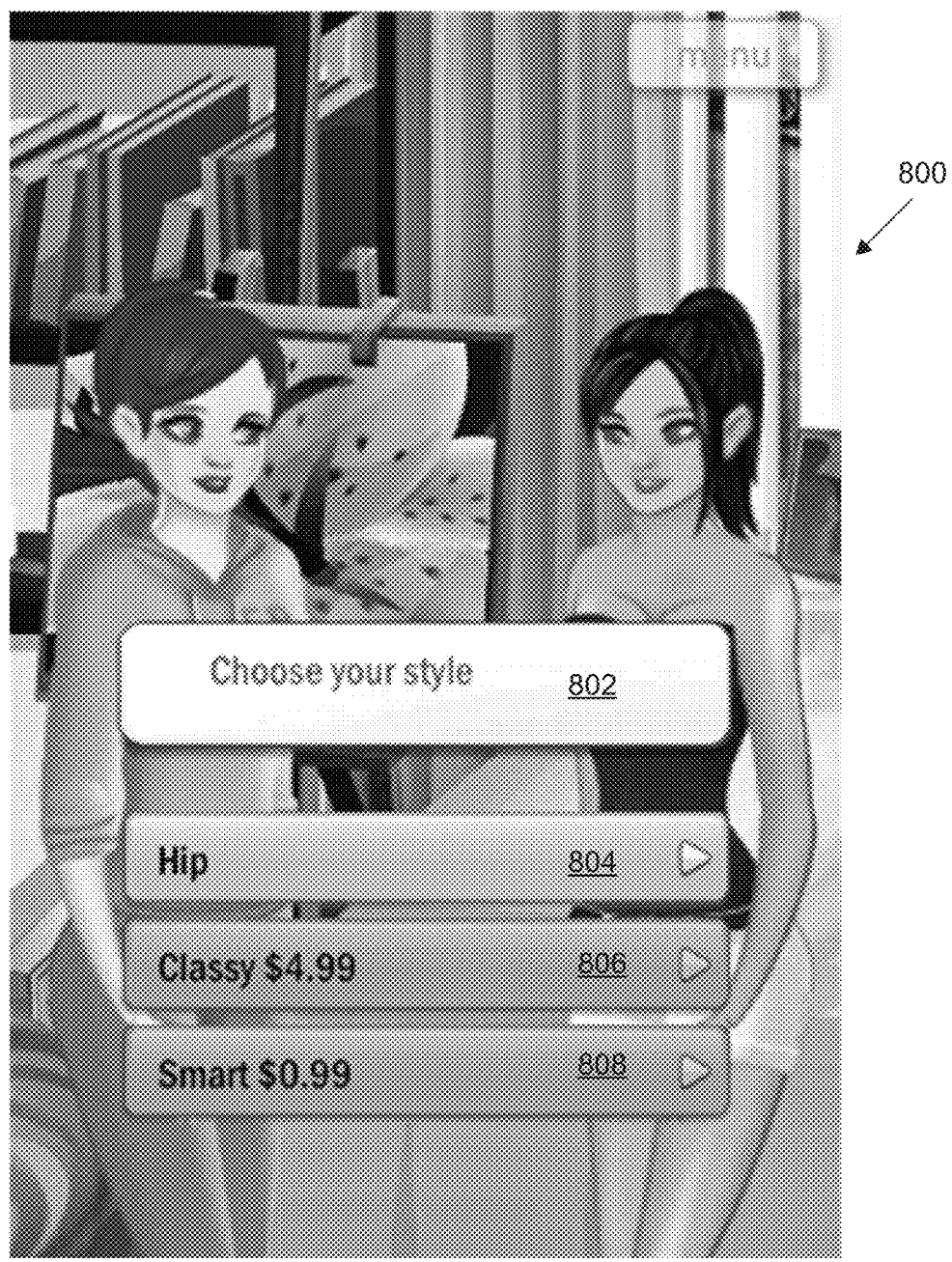
FIG. 8 illustrates an example screenshot showing an example monetization function driven by an embodiment of an access control script, according to some embodiments.

Others of the access control script 224 can enable monetization and/or gating functionalities during animation of a script. FIG. 8 illustrates an example screen 800 displayed on a client 106 showing an example monetization function driven by an embodiment of the access control script 224. A particular access control script 224 includes if/then and/or branching logic to enable user participation involving monetization during viewing of a story/chapter. Screen 800 includes a "choose your style" button 802 that a viewing user can actuate to initiate display of style choices for a character in the story/chapter. Style choices that are displayed may be a "hip" style button 804, a "classy" style button 806, and a "smart" style button 808. The "hip" style is a free monetization choice while each of the "classy" style and "smart" style choices has an associated dollar amount "$4.99" and "$0.99," respectively. If the viewing user selects either button 806 or 808, additional selection choices may be presented and eventually, virtual and/or real currency purchase transaction functionalities (such as discussed above) are exposed to the viewing user to purchase a particular "classy" or "smart" style for the character of interest.

8.0 AUTOMATED FILE PACKAGING

Returning to FIG. 4 and in particular to block 418, the file package sent by the server 102 and received by the client 106 requesting viewing of a particular chapter script is automatically packaged by the server 102 in response to the user request at the client 106 for a particular chapter of a particular story. In response, the server 102 configures just the files/data needed to animate the particular chapter script associated with the particular selected chapter, according to an embodiment. This means, for example, that not all of the image files, audio files, and supporting tables or lists in the database 104 need to be sent to the client 106.

In an embodiment, the server 102 retrieves from database 104 only files/data needed for the particular chapter. In some instances, the server 102 generates one or more CSV files to assemble just the data needed for the particular chapter. For example, if the particular chapter includes four specific backgrounds, then the server 102 may generate an abbreviated or new place CSV file containing just the record rows associated with those four backgrounds from among the record rows of all the available backgrounds in the place CSV file shown in Appendix D. Likewise, the chapter CSV file in the package contains data for just the particular chapter rather than several or all of the chapters of the story or stories as shown in Appendix C. One or more other supporting CSV files, tables, or lists, if necessary, contain chapter-relevant data. The underlying image and audio files are only those files needed to render the particular chapter. The JSON file associated with the particular chapter; the chapter-specific chapter CSV file; the chapter-specific character CSV file; the chapter-specific outfit CSV file; the chapter-specific place CSV file; chapter-specific character spot CSV file; one or more other chapter-specific supporting CSV files, tables, or lists (if needed); and the chapter-specific underlying image and audio files comprise the file package assembled by the server 102. A file package comprising the just-needed files for a chapter can be configured when the chapter is at pre-publication stage or for preview by the author user.

When a user selects a published chapter for "reading" (e.g., from those chapters available from the story catalog), the corresponding file package comprises the JSON file associated with the selected chapter but the rest of the files contain data associated with all of the available published stories/chapters in the story catalog (or data for at least more than just the selected chapter). A catalog-specific/wide chapter CSV file, a catalog-specific/wide character CSV file, a catalog-specific/wide place CSV file, a catalog-specific/wide outfit CSV file, a catalog-specific/wide character spot CSV file, one or more other catalog-specific/wide supporting CSV files, tables, or lists (if needed), and catalog-specific/wide underlying image and audio files may be included in the file package. Since these files are applicable to (all) scripts in the catalog, this same set of files can be included in any file package for any selected published chapter, and thus, may be pre-generated and stored in database 104.

Generation of one or more files (e.g., CSV files) may occur prior to, or in response to, a user request for the particular chapter. The packaging of the files may occur prior to, or in response to, a user request for the particular chapter. In other embodiments, if certain of the files are already present on the client 106, then those files may be excluded from the file package. For example, a current place CSV file may already be stored on the client 106 from previous viewing of a script.

In an alternative embodiment, whether to generate chapter-specific CSV files or to use a single CSV file for all stories available in the catalog may depend upon the relative file sizes. When the single CSV file is negligibly larger in file size than a chapter-specific version, then the single CSV file may be used in the file package. Memory constraints, transmission bandwidth constraints, and/or server resource constraints may factor into which CSV files to generate or re-use.

9.0 SPLIT TESTING OF SCRIPTS

The scripting language is robust enough to enable testing A and B versions of a script in the same script. This type of testing is referred to as A/B testing or split testing. A/B testing precludes the need to send A and B versions of a script to different sets of clients 106. A/B testing facilitates incremental release of new chapters, stories, or other functionalities to test user interest, usability, and the like.

The different scripts embedded in a single A/B test script can be different versions of the same script to test incremental changes. The different scripts embedded in the single A/B test scripts can be two dissimilar scripts with little or no commonality there between to test two different stories. The different scripts embedded in the single A/B test scripts can be two or more different scripts or script portions.

Any of the different uses of scripts to enable monetization, client UI or environment, storytelling, interactive features, etc., any different combinations or versions of these can be tested using A/B tests. An A/B test script includes if/then logic to evaluate one or more particular A/B test variables (e.g., split_test variables) with respect to the user at a client 106. The result of the evaluation(s) determines the rest of the script portion(s) (or version) exposed to the user. Different users experience different stories, UI, choices, etc. relative to each other (or relative to one set of users to another set of users) via CSV files corresponding to the A/B test script.

An example A/B test script is set forth herein in Appendix H. And the corresponding JSON file is set forth herein in Appendix I. The particular A/B test variable in this example script is "SPLIT_TEST_OPTION:promotest is "BLOCK".

Based on the foregoing, numerous features and capabilities of scripts in a scripting language are described herein. It is understood that for all scripts, including storytelling scripts and non-storytelling scripts (e.g., client UI script 220, web view script 222, access control script 224, etc.), user interaction choices, states, conditions, timestamps, and other tracking of user sessions on the clients 106 are logged at the client-side and then uploaded to server 102 (e.g., block 428 of FIG. 4). Server 102 uses the log files to improve scripts, to facilitate continuity and customization of storytelling across different chapters or stories, to adjust stories available in the catalog, and other script-related purposes.

10.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
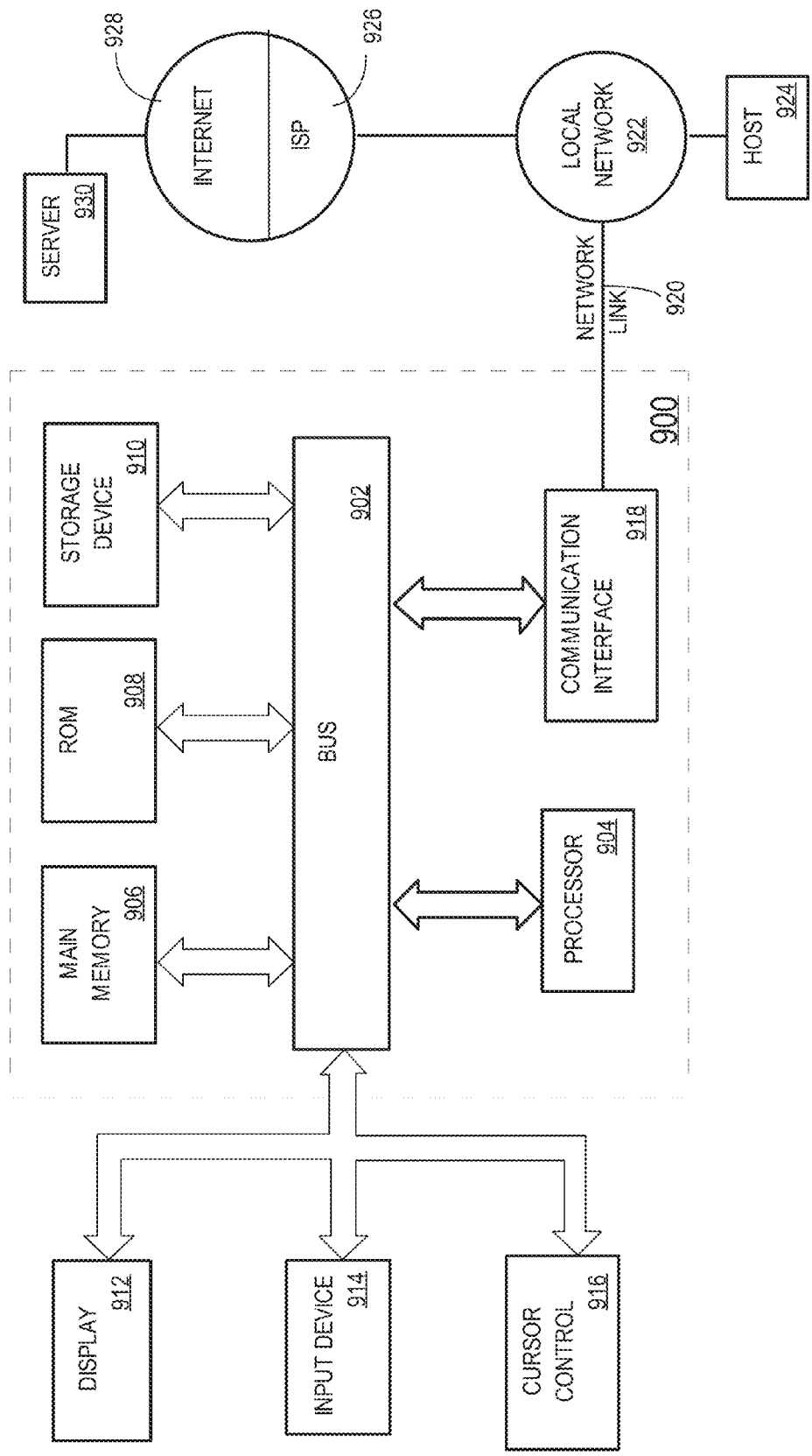
FIG. 9 illustrates a block diagram of an example computer system upon which embodiments of the present disclosure may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT) or liquid crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

11.0 OTHER DISCLOSURE

Embodiments also may implement the subject matter of any one or more of the following numbered clauses:

1. A method of improving operation of computers which define and display audiovisual programs such as animated stories, comprising: using an authoring computer, receiving script data comprising a plurality of natural language stage direction statements, dialog statements and animation control statements of a particular chapter of a particular animated story; using the authoring computer, based upon the script data, creating and storing a structured interpretation file comprising a plurality of nodes each having one or more attributes; transmitting the structured interpretation file to a second computer; using the second computer, interpreting the structured interpretation file to execute each of the nodes using the one or more attributes; based upon the interpreting, generating and displaying on a display device of the second computer an audiovisual program on the second computer that operates according to the script data and comprising one or more visually animated characters that speaks according to the dialog statements, moves according to the animation control statements and is displayed within a graphical setting that is graphically depicted according to the stage direction statements.

2. The method of clause 1, wherein the animation control statements include at least one choice statement comprising an association of at least two choices, wherein each of the at least two choices comprises an alternative dialog statement and an alternative action statement, the method further comprising: displaying, using the second computer, the at least two choices; receiving input from the second computer specifying a selection of one of the at least two choices; executing a particular alternative action statement that is associated with the one of the at least two choices that is indicated in the selection.

3. The method of clause 1, wherein a particular animation control statement among the animation control statements comprises a character identifier, an action, and an action attribute, the method further comprising interpreting the particular animation control statement by graphically animating a particular one of the visually animated characters to perform the action based upon the action attribute.

4. The method of clause 3, wherein the action comprises any of: changing one character into a second character; changing virtual garments that are graphically displayed on the particular character; moving the particular character to a particular stage location; performing a stationary movement; dancing; facing in a particular direction.

5. The method of clause 3 wherein the particular animation control statement comprises two actions connected using an operator and indicating simultaneous actions.

6. The method of clause 3 wherein the script data specifies a plurality of actions for a particular character to perform concurrently.

7. The method of clause 1, wherein the script data comprises a choice operator, and a plurality of choice specifications, wherein each of the choice specifications comprises an association of a choice text, one or more dialog statements, and a choice variable name; the method further comprising: causing displaying all of the choice text; receiving input specifying a selection of a particular choice text; in response to the input, causing animated display of a particular character speaking a particular dialog statement that is associated in the choice specifications with the particular choice text.

8. The method of clause 1, wherein the structured interpretation file comprises a plurality of JSON nodes for a chapter of an animated story; wherein each of the JSON nodes comprises one or more attributes; wherein one or more of the attributes comprises a name-value pair.

9. The method of clause 8, wherein the JSON nodes comprise one or more of: a default node that defines a character speaking dialog; a costume change node that specifies a change in a graphical costume of a character; a director node that specifies an action for animated movement of a character; a choice node that specifies an interactive choice; a flag node that specifies setting a value of a variable; a timed flag node that specifies setting a flag value having a specified time duration; a counter node that specifies a counter value capable of incrementing or decrementing; a branch node that specifies a particular branch in a story; a catalog node that specifies aspects of including the story in a catalog of stories; a web view node that specifies a web page associated with the story.

10. The method of clause 8, further comprising transforming one or more portions of the plurality of JSON nodes into one or more files of comma-separated values (CSVs) prior to transmitting the files to the second computer.

11. The method of clause 1, wherein using the second computer for the interpreting the structured interpretation file to execute each of the nodes using the one or more attributes comprises: using the second computer to perform animation of the particular chapter of the particular animated story including controlling one or more of background, characters, positioning, overlays, movement, dialog, sounds, music, and execution of if/then logic.

12. The method of clause 1, further comprising: using the authoring computer, receiving updated script data comprising one or more updates to the plurality of natural language stage direction statements, dialog statements and animation control statements; using the authoring computer, based upon the updated script data, creating and storing an updated structured interpretation file comprising updated nodes; immediately push transmitting the updated structured interpretation file to the second computer; using the second computer, without restarting an interpretation app hosted on the second computer, interpreting the updated structured interpretation file to execute each of the updated nodes; based upon the interpreting, generating and displaying on a display device of the second computer an updated audiovisual program on the second computer.

13. The method of clause 1, further comprising: receiving and storing a plurality of background graphical images, each of the background graphical images having a number of background graphical display zones that are available in the second computer; transmitting a copy of at least one of the plurality of background graphical images to the second computer; using the second computer, displaying an animated panning sequence across two or more of the background graphical display zones of the at least one of the plurality of background graphical images while displaying the one or more visually animated characters.

14. The method of clause 13, further comprising: using the authoring computer, receiving and storing a plurality of graphical overlays and a Z-value for each of the graphical overlays; transmitting copies of the graphical overlays to the second computer; using the second computer, displaying the graphical overlays graphically over the at least one of the plurality of background graphical images in an order indicated by the Z-value of each of the graphical overlays.

15. The method of clause 7, further comprising, based upon the value of the particular choice variable, using the second computer, modifying an appearance of a graphical user interface of the second computer.

16. The method of clause 7, further comprising, based upon the value of the particular choice variable, using the second computer, modifying an appearance of a graphical background that is displayed on the second computer.

17. The method of clause 7, wherein the script data comprises a choice operator, and a plurality of choice specifications, wherein each of the choice specifications comprises an association of a choice text, one or more dialog statements, and a choice variable name; the method further comprising: causing displaying all of the choice text; receiving input specifying a selection of a particular choice text; in response to the input, setting to TRUE a particular choice variable associated with the choice variable name associated with the particular choice text; based upon the value of the particular choice variable, using the second computer, modifying an appearance of: one or more of the graphical background images, or one or more of the graphical overlays.

18. The method of clause 1, wherein the script data comprises a counter declaration that specifies a chapter pass counter having a specified value greater than zero, a condition statement configured to test the chapter pass counter, and a monetization statement that requires a payment to progress in the story beyond the monetization statement; the method further comprising: using the second computer, during the generating and displaying: in response to interpreting the condition statement, testing a then-current value of the chapter pass counter, and only when the testing results in determining that a then-current value of the chapter pass counter is not zero, decrementing the chapter pass counter and permitting further generating and displaying the particular chapter.

19. The method of clause 1, wherein the script data specifies a chapter pass counter having a specified value greater than zero; the method further comprising: using the second computer, testing a then-current value of the chapter pass counter, and only when the testing results in determining that a then-current value of the chapter pass counter is not zero, decrementing the chapter pass counter and permitting further generating and displaying the particular chapter.

20. The method of clause 1, wherein the script data comprises a plurality of catalog declarations each specifying showing a particular named story or chapter in a catalog of stories or chapters; and the method further comprising: using the authoring computer, receiving and storing script data for one or more other stories or chapters other than those stories or chapters that are specified in the plurality of catalog declarations; using the second computer, based upon the script data, displaying a catalog of stories or chapters that includes only those stories or chapters that are specified in the plurality of catalog declarations.

21. The method of clause 20, wherein the script data further comprises a header declaration that specifies two or more header labels, and two or more list declarations each respectively corresponding to a particular header label among the two or more header labels and comprising corresponding lists of chapters or stories; the method further comprising: using the second computer, based upon the script data, displaying the two or more header labels in header positions of the catalog; displaying, in two or more lists that are below and associated with the two or more header labels respectively, the corresponding lists of chapters or stories.

22. The method of clause 1 wherein the second computer is any of a smartphone, a tablet computer, and a handheld computer.

23. The method of clause 1, wherein the script data comprises: a plurality of sections wherein each of the sections is associated with a particular test among a plurality of tests; a plurality of condition statements each associated with a particular testing condition that is also associated with one particular test among the plurality of tests; a plurality of test variables each associated with one of the tests and configured using one of a plurality of values; and the method further comprising: during the displaying, upon interpreting a particular section among the plurality of sections, testing a particular condition statement within the particular section, determining whether a test variable specified in the particular condition statement has a valid value, and continuing interpreting the particular section only when the test variable has a valid value, otherwise skipping interpreting the particular section and continuing interpreting a different particular section.

12.0 EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computerized method, comprising:
receiving a meta-language file comprising a conversion of a script file in a natural language format, the script file including a plurality of natural language statements;
interpreting, by a first computing device, the meta-language file for execution of at least a first portion of the meta-language file;
dynamically generating and displaying, on the first computing device, one or more visually animated graphical elements in accordance with the execution of the at least a first portion of the meta-language file;
wherein the one or more visually animated graphical elements comprise an action element that relates to a background comprising a plurality of zones, and that causes displaying a first zone, of the plurality of zones, of the background;
in response to a user interactive action taken on the one or more visually animated graphical elements of the at least a first portion of the meta-language file, by a first user on the first computing device, setting at least one parameter based on the user interactive action;
wherein setting the at least one parameter causes a third meta-language file associated with the script file to particularly execute for a second user that is different from execution of the third meta-language file for the second user when the at least one parameter is not set;
wherein setting the at least one parameter causes modifying the action element to cause displaying a second zone, of the plurality of zones, of the background;
receiving a second meta-language file comprising a conversion of a second script file in a natural language format, the second script file including a plurality of natural language statements, the second script file separate and different from the script file;
interpreting the second meta-language file for particular execution of at least a second portion of the second meta-language file in accordance with the at least one parameter, wherein the at least one parameter persists from the third meta-language file to the second meta-language file;
dynamically generating and displaying one or more second visually animated graphical elements in accordance with the particular execution of the at least a second portion of the second meta-language file, including displaying the second zone of the background;
wherein the at least a second portion of the second meta-language file executes differently from the particular execution when the at least one parameter is not set.

2. The method of claim 1, wherein the plurality of natural language statements included in the script file comprises one or more dialog natural language statements, and wherein dynamically generating and displaying the one or more visually animated graphical elements comprises dynamically generating and displaying one or more visually animated characters that speaks according to the one or more dialog natural language statements.

3. The method of claim 1, wherein the plurality of natural language statements included in the script file comprises one or more dialog natural language statements, and wherein dynamically generating and displaying the one or more visually animated graphical elements comprises dynamically generating and displaying one or more visually animated speech bubbles according to the one or more dialog natural language statements.

4. The method of claim 3, wherein the one or more dialog natural language statements is associated with a narrator of a story.

5. The method of claim 1, wherein the plurality of natural language statements included in the script file comprises one or more character movement control natural language statements, and wherein dynamically generating and displaying the one or more visually animated graphical elements comprises dynamically generating and displaying one or more visually animated characters moving according to the one or more character movement control natural language statements.

6. The method of claim 1, wherein the plurality of natural language statements included in the script file comprises one or more stage direction natural language statements, and wherein dynamically generating and displaying the one or more visually animated graphical elements comprises dynamically generating and displaying one or more visually animated characters located within a graphical setting according to the one or more stage direction natural language statement.

7. The method of claim 1, wherein the plurality of natural language statements included in the script file comprises one or more character behavior natural language statements, and wherein dynamically generating and displaying the one or more visually animated graphical elements comprises dynamically generating and displaying one or more visually animated characters performing particular behavior actions according to the one or more character behavior natural language statement.

8. The method of claim 1, wherein the plurality of natural language statements included in the script file comprises one or more background natural language statements, and wherein dynamically generating and displaying the one or more visually animated graphical elements comprises dynamically generating and displaying one or more visually animated backgrounds according to the one or more background natural language statement.

9. The method of claim 1, wherein the plurality of natural language statements included in the script file comprises one or more character outfit natural language statements, and wherein dynamically generating and displaying the one or more visually animated graphical elements comprises dynamically generating and displaying one or more visually animated characters wearing one or more respective clothing and accessories according to the one or more character outfit natural language statement.

10. The method of claim 1, wherein the plurality of natural language statements included in the script file comprises one or more audio natural language statements, and further comprising dynamically generating and audibly presenting one or more audio elements according to the one or more audio natural language statements.

11. One or more non-transitory machine-readable media storing instructions which, when executed by one or more processors, cause performance comprising:
receiving a meta-language file comprising a conversion of a script file in a natural language format, the script file including a plurality of natural language statements;
interpreting, by a first computing device, the meta-language file for execution of at least a first portion of the meta-language file;
dynamically generating and displaying, on the first computing device, one or more visually animated graphical elements in accordance with the execution of the at least a first portion of the meta-language file;
wherein the one or more visually animated graphical elements comprise an action element that relates to a background comprising a plurality of zones, and that causes displaying a first zone, of the plurality of zones, of the background;
in response to a user interactive action taken on the one or more visually animated graphical elements of the at least a first portion of the meta-language file, by a first user on the first computing device, setting at least one parameter based on the user interactive action;
wherein setting the at least one parameter causes a third meta-language file associated with the script file to particularly execute for a second user that is different from execution of the third meta-language file for the second user when the at least one parameter is not set;
wherein setting the at least one parameter causes modifying the action element to cause displaying a second zone, of the plurality of zones, of the background;
receiving a second meta-language file comprising a conversion of a second script file in a natural language format, the second script file including a plurality of natural language statements, the second script file separate and different from the script file;
interpreting the second meta-language file for particular execution of at least a second portion of the second meta-language file in accordance with the at least one parameter, wherein the at least one parameter persists from the third meta-language file to the second meta-language file;
dynamically generating and displaying one or more second visually animated graphical elements in accordance with the particular execution of the at least a second portion of the second meta-language file, including displaying the second zone of the background;
wherein the at least a second portion of the second meta-language file executes differently from the particular execution when the at least one parameter is not set.

12. The one or more non-transitory machine-readable media of claim 11, wherein dynamically generating and displaying comprises dynamically generating and displaying one or more visually animated avatars representative of respective one or more characters specified in the script file.

13. The one or more non-transitory machine-readable media of claim 11, wherein the meta-language file comprises a JavaScript Object Notation (JSON) file.

14. The one or more non-transitory machine-readable media of claim 11, wherein the instructions, when executed by the one or more processors, further cause performance comprising generating the script file based on user input of the plurality of natural language statements.

15. The one or more non-transitory machine-readable media of claim 14, wherein the user input is provided on the first computing device or a second computing device that is different from the first computing device.

16. The one or more non-transitory machine-readable media of claim 11, wherein the instructions, when executed by the one or more processors, further cause performance comprising:
receiving one or more supporting files;
wherein interpreting the meta-language file comprises using the one or more supporting files to identify one or more graphical representations corresponding to the one or more visually animated graphical elements;
wherein dynamically generating and displaying comprises dynamically rendering at runtime, the one or more graphical representations in accordance with the meta-language file to dynamically display the one or more visually animated graphical elements.

17. The one or more non-transitory machine-readable media of claim 11, wherein dynamically generating and displaying the one or more visually animated graphical elements comprises:
dynamically generating and displaying a character image;
dynamically generating and displaying one or more animated images of individual moving body parts of the character without re-generating or re-displaying the entire character.

18. The one or more non-transitory machine-readable media of claim 11, wherein the one or more visually animated graphical elements comprise one or more user interface (UI) commands associated with presenting one or more listings of a plurality of available story representations in a story catalog, each of the plurality of available story representations corresponding to a respective animated story.

19. The one or more non-transitory machine-readable media of claim 11, wherein the plurality of natural language statements in the script file includes one or more references to web pages;
wherein interpreting the meta-language file comprises interpreting the meta-language file to execute a second portion of the meta-language file associated with the one or more references to web pages;

wherein dynamically generating and displaying comprises dynamically generating and displaying one or more web pages in accordance with the execution of the second portion of the meta-language file.

20. The one or more non-transitory machine-readable media of claim 11, wherein the plurality of natural language statements in the script file includes one or more monetization commands, and wherein dynamically generating and displaying comprises dynamically generating and displaying the one or more visually animated graphical elements to use virtual or real currency by a user interfacing with the first computing device.

21. The one or more non-transitory machine-readable media of claim 20, wherein the one or more monetization commands includes one or more counter commands to selectively alter a state value associated with the user to control access to one or more portions of the script file by the user.

22. The one or more non-transitory machine-readable media of claim 11, wherein the plurality of natural language statements in the script file includes one or more choice commands, and wherein the instructions, when executed by the one or more processors, further cause performance comprising:

receiving, at the first computing device, a user selection of a choice from among at least a first choice and a second choice associated with the one or more choice commands, at least the first and second choices presented as the one or more visually animated graphical elements;

in response to receiving the first choice as the user selected choice, interpreting the meta-language file comprising interpreting the meta-language file to execute the first portion of the meta-language file corresponding to a first branch associated with the first choice, and dynamically generating and displaying comprising dynamically generating and displaying one or more first visually animated graphical elements in accordance with the execution of the first portion of the meta-language file corresponding to the first branch associated with the first choice;

in response to receiving the second choice as the user selected choice, interpreting the meta-language file to execute a second portion of the meta-language file corresponding to a second branch associated with the second choice, and dynamically generating and displaying one or more second visually animated graphical elements in accordance with the execution of the second portion of the meta-language file corresponding to the second branch associated with the second choice.

23. The one or more non-transitory machine-readable media of claim 22, wherein the instructions, when executed by the one or more processors, further cause performance comprising saving the user selected choice for use in dynamically generating and displaying an another portion of the meta-language file or an another meta-language file associated with an another script file that is different from the script file.

24. One or more non-transitory machine-readable media storing instructions which, when executed by one or more processors, cause performance comprising:

dynamically generating and displaying, at a first computing device, one or more visually animated graphical elements in accordance with script data;

wherein the script data comprises one or more dialog statements and at least one of one or more character movement control statements, one or more character animation statements, or one or more stage direction statements composed in natural language syntax;

wherein the one or more visually animated graphical elements comprise one or more speech bubbles according to the one or more dialog statements;

wherein the one or more visually animated graphical elements comprise an action element that relates to a background comprising a plurality of zones, and that causes displaying a first zone, of the plurality of zones, of the background;

in response to a user interactive action taken on the one or more visually animated graphical elements, by a first user on the first computing device, setting at least one parameter based on the user interactive action;

wherein setting the at least one parameter causes one or more visually animated graphical elements associated with the script data to particularly execute for a second user that is different from execution for the second user when the at least one parameter is not set;

wherein setting the at least one parameter causes modifying the action element to cause displaying a second zone, of the plurality of zones, of the background;

dynamically generating and displaying one or more second visually animated graphical elements in accordance with second script data and the at least one parameter, the second script data separate and different from the script data, including displaying the second zone of the background;

wherein the at least one parameter persists from the script data to the second script data.

25. The one or more non-transitory machine-readable media of claim 24, wherein the instructions, when executed by the one or more processors, further cause performance comprising:

receiving, at the first computing device, the script data or representation of the script data in response to a selection of the script data by a user;

responsive to the selection of the script data, dynamically interpreting, by the first computing device, the script data or representation of the script data to render at least a first portion of the script data.

26. The one or more non-transitory machine-readable media of claim 25, wherein the representation of the script data comprises a translation of the script data in a computer-readable format.

27. The one or more non-transitory machine-readable media of claim 24, wherein the instructions, when executed by the one or more processors, further cause performance comprising:

receiving the script data based on user input of the one or more dialog statements and at least one of the one or more character movement control statements and the one or more character animation statements composed in natural language syntax;

wherein dynamically generating and displaying are prevented until errors identified in an automatic testing of the script data are resolved in the script data.

28. The one or more non-transitory machine-readable media of claim 24, wherein the script data comprises at least one of: (1) one or more user interface (UI) statements associated with dynamically generating and displaying one or more listings of a plurality of available story representations in a story catalog, each of the plurality of available story representations corresponding to a respective animated story, (2) one or more references to web pages associated with dynamically generating and displaying one or more web pages in accordance with the one or more references to the web pages, and (3) one or more choice statements associated with dynamically generating and displaying one or more graphical choice elements for interaction with a user during the dynamically generating and displaying of the one or more visually animated graphical elements.

29. The one or more non-transitory machine-readable media of claim 24, wherein the script data comprises one or more audio natural language statements, and wherein the instructions, when executed by the one or more processors, further cause performance comprising:

dynamically generating and audibly presenting one or more audio elements according to the one or more audio natural language statements.

30. The one or more non-transitory machine-readable media of claim 24, wherein dynamically generating and displaying the one or more visually animated graphical elements comprises:

dynamically generating and displaying a character image;

dynamically generating and displaying one or more animated images of individual moving body parts of the character without re-generating or re-displaying the entire character.

\* \* \* \* \*